(12) United States Patent
Nylander et al.

(10) Patent No.: US 8,537,751 B2
(45) Date of Patent: Sep. 17, 2013

(54) MINIMIZING TRACKING AREA UPDATES IN HETEROGENEOUS RADIO ACCESS NETWORK

(75) Inventors: Tomas Nylander, Värmdö (SE); Tomas Hedberg, Stockholm (SE); Jari Vikberg, Järna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 297 days.

(21) Appl. No.: 13/019,056

(22) Filed: Feb. 1, 2011

(65) Prior Publication Data

US 2012/0195255 A1 Aug. 2, 2012

(51) Int. Cl.
*H04W 4/00* (2009.01)
(52) U.S. Cl.
USPC ......... 370/328; 370/338; 455/404.2; 455/444
(58) Field of Classification Search
USPC ................ 455/436–439, 444, 15, 500, 404.2, 455/456.1, 67.11, 115.1, 445, 446; 370/328, 370/329, 332, 338
See application file for complete search history.

(56) References Cited

U.S. PATENT DOCUMENTS

| | | | | |
|---|---|---|---|---|
| 8,305,987 | B2 * | 11/2012 | Fong et al. | 370/329 |
| 2009/0129350 | A1 * | 5/2009 | Khandekar et al. | 370/338 |
| 2010/0279684 | A1 * | 11/2010 | Salkintzis | 455/434 |
| 2011/0306340 | A1 * | 12/2011 | Lindoff et al. | 455/434 |
| 2011/0319025 | A1 * | 12/2011 | Siomina et al. | 455/63.1 |
| 2012/0071190 | A1 * | 3/2012 | Choi et al. | 455/517 |

FOREIGN PATENT DOCUMENTS

| | | |
|---|---|---|
| WO | 2009/120127 A1 | 10/2009 |
| WO | 2010/036167 A1 | 4/2010 |

OTHER PUBLICATIONS

International Search Report and Written Opinion mailed Oct. 26, 2011 in PCT Application No. PCT/SE2011/050113.
Huawei, "Discussion about TAs for CSG Cells and Non-CSG Cells", 3GPP Draft: C1-083278, $3^{rd}$ Generation Partnership Project (3GPP), Mobile Competence Centre; 650, Route Des Lucioles, F-06921 Sophia-Antipolis CEDEX, France, no. Budapest, Hungary, 20080811, Aug. 11, 2008.
3GPP TS 23.401 V10.2.1 (Jan. 2011); 3rd Generation Partnership Project; Technical Specification Group Services and System Aspects; General Packet Radio Service (GPRS) enhancements for Evolved Universal Terrestrial Radio Access Network (E-UTRAN) access Release 10).

(Continued)

*Primary Examiner* — Cong Tran
(74) *Attorney, Agent, or Firm* — Nixon & Vanderhye, P.C.

(57) ABSTRACT

A communications network (20) that comprises packet core network entity (22) and a heterogeneous radio access network (23). The heterogeneous radio access network (23) comprises plural base station nodes, including at least one macro base station node (28M) and at least one low power base station node (28L). The packet core network entity (22) generates a list (30) of tracking areas using an indication of cell type (32M) for the macro base station node and an indication of cell type (32L) for the low power base station node. The list (30) generated by the packet core network entity comprises the tracking area for the macro base station node and the tracking area for the low power base station node. In an example embodiment the indication of cell type indicates whether the cell served by the respective base station node is a macro cell or a low power cell.

25 Claims, 21 Drawing Sheets

(56) References Cited

OTHER PUBLICATIONS

3GPP TS 36.300 V10.2.0 (Dec. 2010); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10).

3GPP TS 36.413 V10.0.1 (Jan. 2011); 3rd Generation Partnership Project; Technical Specification Group Radio Access Network; Evolved Universal Terrestrial Radio Access Network (E-UTRAN); S1 Application Protocol (S1AP) (Release 10).

3GPP TS 25.413 V10.0.1 (Jan. 2011) 3rd Generation Partnership Project; Technical Specification Group Radio Access Network; UTRAN Iu interface Radio Access Network Application Part (RANAP) signalling (Release 10).

* cited by examiner

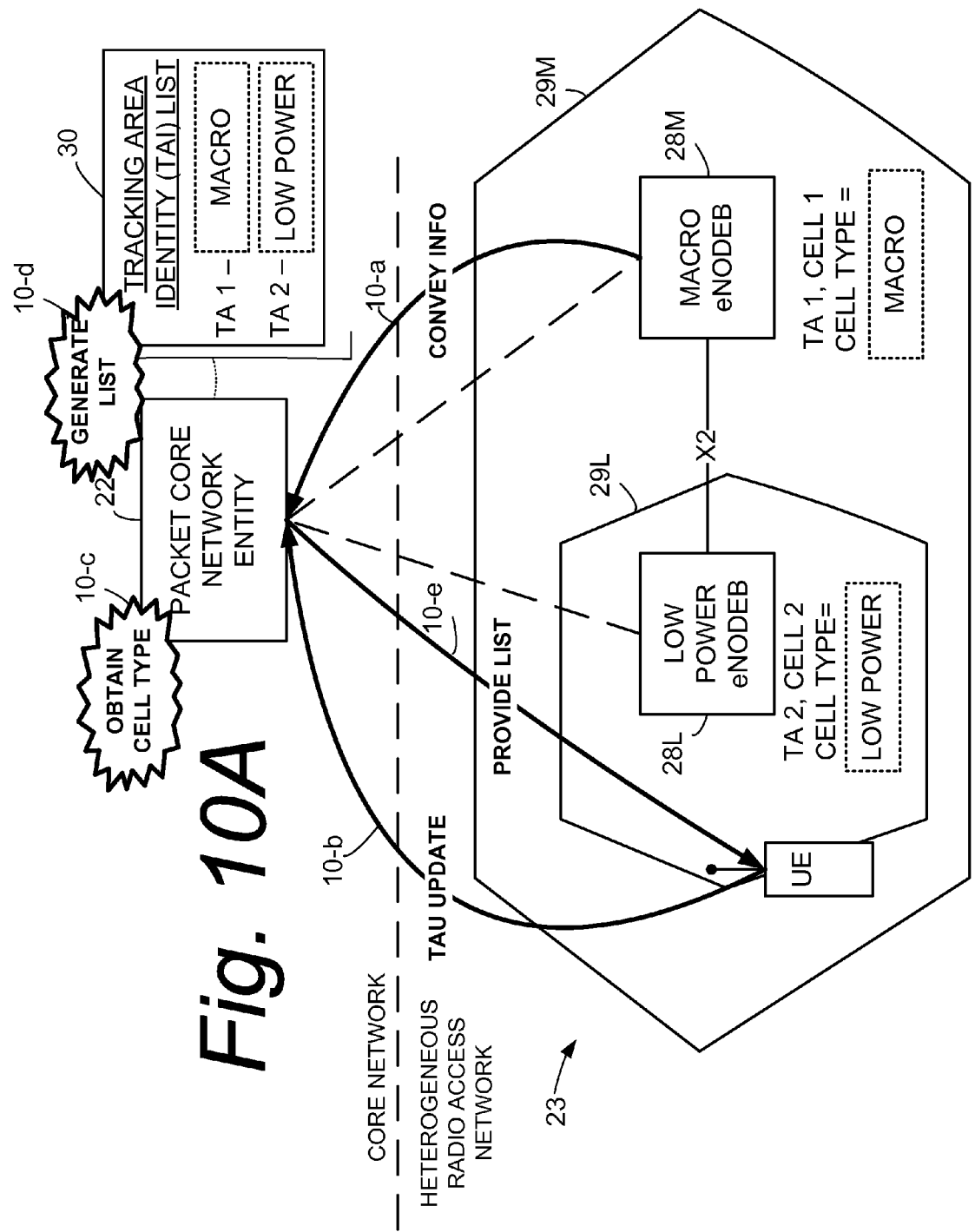

MINIMIZING TRACKING AREA UPDATES IN HETEROGENEOUS RADIO ACCESS NETWORK

TECHNICAL FIELD

This invention pertains to telecommunications, and particularly to reducing signaling involved in tracking area update (TAU) procedures.

BACKGROUND

In a typical cellular radio system, wireless terminals (also known as mobile stations and/or user equipment units (UEs)) communicate via a radio access network (RAN) to one or more core networks. The radio access network (RAN) covers a geographical area which is divided into cell areas, with each cell area being served by a base station, e.g., a radio base station (RBS), which in some networks may also be called, for example, a "NodeB" (UMTS) or "eNodeB" (LTE). A cell is a geographical area where radio coverage is provided by the radio base station equipment at a base station site. Each cell is identified by an identity within the local radio area, which is broadcast in the cell. Another identity identifying the cell uniquely in the whole mobile network is also broadcasted in the cell. The base stations communicate over the air interface operating on radio frequencies with the user equipment units (UE) within range of the base stations.

In some versions of the radio access network, several base stations are typically connected (e.g., by landlines or microwave) to a controller node (such as a radio network controller (RNC) or a base station controller (BSC)) which supervises and coordinates various activities of the plural base stations connected thereto. The radio network controllers are typically connected to one or more core networks.

The Universal Mobile Telecommunications System (UMTS) is a third generation mobile communication system, which evolved from the second generation (2G) Global System for Mobile Communications (GSM). UTRAN is essentially a radio access network using wideband code division multiple access for user equipment units (UEs). In a forum known as the Third Generation Partnership Project (3GPP), telecommunications suppliers propose and agree upon standards for third generation networks and UTRAN specifically, and investigate enhanced data rate and radio capacity. Specifications for the Evolved Packet System (EPS) have completed within the $3^{rd}$ Generation Partnership Project (3GPP) and this work continues in the coming 3GPP releases. The EPS comprises the Evolved Universal Terrestrial Radio Access Network (E-UTRAN) (also known as the Long Term Evolution (LTE) radio access) and the Evolved Packet Core (EPC) (also known as System Architecture Evolution (SAE) core network). E-UTRAN/LTE is a variant of a 3GPP radio access technology wherein the radio base station nodes are directly connected to the EPC core network rather than to radio network controller (RNC) nodes. In general, in E-UTRAN/LTE the functions of a radio network controller (RNC) node are distributed between the radio base stations nodes (eNodeB's in LTE) and the core network. As such, the radio access network (RAN) of an EPS system has an essentially "flat" architecture comprising radio base station nodes without reporting to radio network controller (RNC) nodes.

Long Term Evolution (LTE) uses single-carrier frequency-division multiple access (SC-FDMA) in an uplink direction from the wireless terminal to the eNodeB. SC-FDMA is advantageous in terms of power amplifier (PA) efficiency since, e.g., the SC-FDMA signal has a smaller peak-to-average ratio than an orthogonal frequency division multiple access (OFDM) signal. However, SC-FDMA gives rise to inter-symbol interference (ISI) problem in dispersive channels. Address inter-symbol interference (ISI) can enable SC-FDMA to improve power amplifier efficiency without sacrificing performance.

FIG. 1 shows an example implementation of the aforementioned the Evolved Packet System as comprising for example the E-UTRAN radio access network and the Mobility Management Entity (MME) in the EPC. The mobility management entity (MME) handles various control functions. The nodes and LTE/SAE or EPS architecture of FIG. 1 and other architecture scenarios are understood with reference to 3GPP TS 23.401, which is incorporated herein by reference and which provides, e.g., a system architecture description.

In some of its implementations, the E-UTRAN may comprise a number of different base stations, e.g., eNodeBs (eNBs) as shown in FIG. 2. S1-MME interface/reference point is used for control signaling between the eNBs and the mobility management entity (MME). An eNB may have S1 links to multiple MMEs in case the MME pool concept is used. The user plane data goes via the Serving GateWay (SGW) on S1-U interface/reference point. Between eNBs the X2 interface/reference point is used.

In a cellular network there will always be areas with high traffic, i.e. high concentration of users. In those areas it may be desirable to deploy additional capacity to keep the user satisfaction. In this respect, a number of approaches are possible: (i) increase the density of their existing macro base stations; (ii) increase the cooperation between macro base stations; or (iii) deploy smaller base stations in areas where high data rates are needed within a macro base stations grid. This last option involves deploying nodes with lower output power and thus which cover a smaller area in order to concentrate the capacity boost on a smaller area.

There will also be areas with bad coverage where there is a need for coverage extension, and again one way to do that is to deploy a node with low output power to concentrate the coverage boost in a small area Such a smaller radio base station is also called a "femto radio base station" and/or a "home radio base station" and/or "pico radio base station" and/or "micro radio base station" in some contexts. All such small radio base stations are collectively referred to herein as a low power base station in view of the fact that such base stations, in their communications with a wireless terminal, have less output power than a macro base station. For example, whereas a macro base station may transmit with a power of approximately 20 watts, a low power base station may transmit with a power of approximately one watt.

One argument for choosing nodes with lower output power in the above cases is that the impact on the macro network can be minimized, e.g., there is a smaller area where the macro network may experience interference.

Currently there is a strong drive in the industry in the direction towards the use of such low power nodes. The different terms used for a type of network that deploys both macro base station node and low power nodes include "Heterogeneous Networks", "Multilayer Networks", and (in abbreviated fashion) "HetNets". The layer comprising smaller, low power base stations is sometimes termed a "micro" or "pico" or "femto" layer.

In the above regard, FIG. 3 shows portions of an example heterogeneous radio access network. FIG. 3 illustrates a macro base station (the high tower) 24 which provides a wide area coverage (also called macro cell), as well as examples of low power nodes that are deployed to provide small area capacity/coverage. In other words, FIG. 3 shows examples of types of cells and base stations encompassed by the terminology "low power cell" and "low power base station" as including pico cells and pico base stations, femto cells (which can exist in a femto cluster) and femto base stations, and relay base stations.

The base station nodes (eNBs) are configured with a parameter known as their "cell type", and this configured information indicates the size of the cell, e.g. "very small", "small", "medium", "large". However this information is currently not known in the core network nodes such as the mobility management entity (MME).

A new principle has been introduced for location registration in the SAE/LTE networks. This principle is based on a Tracking Area (TA) concept in a similar way as Location Areas (LA) and Routing Areas (RA) in Global System for Mobile communication (GSM) and WCDMA networks. Each SAE/LTE cell belongs to a single TA and an identification of the Tracking Area, known as the Tracking Area Identity (TAI), is broadcasted as part of the System Information. The Tracking Area Identity (TAI) consists of a Mobile Country Code (MCC), a Mobile Network Code (MNC), and a Tracking Area Code (TAC).

The main difference between the Tracking Area (TA) concept and the LA/RA concepts is that in SAE/LTE a further concept called "multiple TAs" or "TAI List" has been introduced. The concept is somewhat similar to the registered zones in cdma2000. This further TAI List concept means that the network may return a TAI List to a user equipment unit (UE) as part of some EMM procedures like Attach, Tracking Area Update (TAU) and GUTI Reallocation. As long as the UE camps on a cell belonging to a TA whose TAI is included in the UE's current TAI List, the UE does not perform normal tracking area updates (TAUs), although periodic TAUs are still performed. The UE performs normal TAU only when it moves to a cell that does not belong to a Tracking Area (TA) in the TAI List. As part of this TAU the UE will receive a new TAI List and the same procedure continues.

As the network knows the UE location for UEs in idle mode (i.e. in RRC-IDLE state) on the TAI List level, this means that the Paging Area is also normally all the TAs included in the TAI List. The Paging procedure is used to inform an UE in RRC-IDLE about an "incoming call" and the need for the UE to move to the RRC-CONNECTED state.

So in an LTE/SAE or EPS (i.e. E-UTRAN and Evolved Packet Core [EPC]) network the user location in idle mode is known in the mobile core network on TAI List level. A Tracking Area (TA) could be the coverage area of one or more cells served by base stations, i.e. eNBs in an E-UTRAN. The MME knows which eNB(s) provide coverage in a Tracking Area (TA), so when a user should be activated, the mobile core network orders the relevant eNB(s) to page the user.

The coverage from a low power cell would provide a relatively small cell within a macro cell as illustrated in FIG. 4. When a UE toggles between a low power cell and a macro cell and these cells belong to different tracking areas (and not to the UE's current TAI list) in the manner shown by way of example in FIG. 4, the core network needs to be informed as described previously by the UE performing a tracking area update (TAU) procedure. This means increased signaling and processing both in the E-UTRAN and in the evolved packet core (EPC). This increased UE signaling also affects the UE battery in a negative way.

SUMMARY

In one of its aspects the technology disclosed herein concerns a communications network that comprises packet core network entity and a heterogeneous radio access network. The heterogeneous radio access network comprises plural base station nodes, including at least one macro base station node and at least one low power base station node. The packet core network entity is configured to generate a list of tracking areas using an indication of cell type for the macro base station node and an indication of cell type for the low power base station node. The list generated by the packet core network entity comprises the tracking area for the macro base station node and the tracking area for the low power base station node. In an example embodiment the indication of cell type indicates whether the cell served by the respective base station node is a macro cell or a low power cell.

In one of its aspects the technology disclosed herein concerns a packet core network entity. In an example embodiment the packet core network entity comprises an acquisition unit and a list generator. The acquisition unit is configured to obtain information regarding plural base station nodes comprising a heterogeneous radio access network. The plural base station nodes comprise a first base station node and a second base station node, at least one of the first base station node and the second base station node being a macro base station node and another of the first base station node and the second base station node being a low power base station node. The obtained information comprises a tracking area for the first base station node; an indication of cell type for a cell served by the first base station node; a tracking area for the second base station node; and an indication of cell type for the cell served by the second base station node. The list generator is configured to generate a list of tracking areas using the indication of cell type for the first base station node and the indication of cell type for the low power base station node. The list comprises the tracking area for the first base station node and the tracking area for the second base station node.

In an example embodiment, the acquisition unit of the packet core network entity comprises an interface that receives information from the heterogeneous radio access network. In some example embodiments the interface receives the obtained information from the heterogeneous radio access network. In other example embodiments, in addition to the acquisition unit and interface, the packet core network entity comprises a cell type discriminator which is configured to determine the cell type of a cell served by the at least one of the plural base station node based on a preconfigured relation of cell type and other information. In various example implementations such other information may comprise at least one parameter such as tracking area, Physical Cell Identity (PCI), and E-UTRAN Cell Global Identity (E-CGI), or a range of values associated with one or more such parameter(s).

In an example embodiment, the acquisition unit is configured to obtain from the first base station node the tracking area of the first base station node, the cell type of the cell served by the first base station node, the tracking area of the second base station node. and the cell type of the cell served by the second base station node. The list generator is configured to generate the list using the tracking area of the first base station node and the tracking area of the second base station node if the cell types of the cell served by the first base station node and the cell type of the cell served by the second base station node are different.

In an example embodiment, the list generator is configured to include on the list both the tracking area of the first base station node and the tracking area of the second base station node when the packet core network entity receives the tracking area of the second base station node as a last visited tracking area when the wireless terminal performs a tracking area update in a cell served by the first base station node, and when the list generator knows that at least one of the tracking area of the first base station node and the tracking area of the second base station node is associated with a low power node.

In another of its aspects the technology disclosed herein concerns a base station node of a heterogeneous radio access network. The base station comprises an interface and a report generator. The interface is configured to communicate information to a packet core network entity. The report generator configured to include, in a message sent to the packet core network entity, a cell type identifier. In one example embodiment the cell type identifier reported by the base station is for a cell served by the base station node. In the same or another example embodiment the cell type reported by the base station is for a cell served by another base station of the heterogeneous radio access network, and in which case the report generator is further configured to include in the message an indication of a tracking area of the cell served by the other base station node of the heterogeneous radio access network.

In another of its aspects the technology disclosed herein concerns a method of operating a communications network, the network comprising a packet core network entity and a heterogeneous radio access network. In a basic example embodiment and mode, the method comprises the packet core network entity obtaining information comprising a tracking area for the first base station node; an indication of cell type for a cell served by the first base station node; a tracking area for the second base station node; and an indication of cell type for the cell served by the second base station node. The method further comprises the packet core network entity generating a list of tracking areas using the indication of cell type for the first base station node and the indication of cell type for the low power base station node. The list comprises the tracking area for the first base station node and the tracking area for the second base station node.

The method of operation the network includes several example embodiments and modes, including a list generation mode based on neighbor node-reporting and a list generation mode based on tracking area update (TAU).

In the list generation mode based on neighbor node-reporting, the method further comprises (a) the first base station node obtaining the tracking area of the second base station node and the cell type of a cell served by the second base station node; and (b) the first base station node conveying to a packet core network entity the tracking area of the first base station node and the cell type of the cell served by the first base station node and the tracking area of the second base station node and the cell type of the cell served by the second base station node. The packet core network generates the list using the tracking area of the first base station node and the cell type of the cell served by the first base station node; and the tracking area of the second base station node and the cell type of the cell served by the second base station node. For example, if the cell types of the cell served by the first base station node and the cell type of the cell served by the second base station node are different, the packet core network generates the list using the tracking area of the first base station node and the tracking area of the second base station node.

In an example implementation of the list generation mode based on neighbor node-reporting, the act of obtaining the tracking area of the second base station node and the cell type of a cell served by the second base station node may comprise the first base station node using an existing automatic neighbor relation function to obtain from a wireless terminal the tracking area of the second base station node. In such example implementation the act of conveying the tracking area of the second base station node and the cell type of the cell served by the second base station node may comprise including the tracking area of the second base station node and the cell type of the cell served by the second base station node as new information element(s) in a ENB CONFIGURATION UPDATE message.

In an example implementation of the list generation mode based on neighbor node-reporting, the method further comprises the first base station node determining the cell type of the cell served by the second base station node based on a preconfigured relation of cell type and other information. In an example implementation such other information may comprise at least one parameter such as tracking area, Physical Cell Identity (PCI), and E-UTRAN Cell Global Identity (E-CGI), or a range of values associated with one or more such parameter(s).

In the list generation mode based on neighbor node-reporting, the first of the plural base station nodes may be the macro base station node and the second of the plural base station nodes may be the low power base station node. Alternatively, the first of the plural base station nodes may be the low power base station node and the second of the plural base station nodes may be the macro power base station node.

In the list generation mode based on tracking area update (TAU), the method further comprises (a) the first base station node conveying to a packet core network entity the tracking area of the first base station node; (b) the second base station node conveying to a packet core network entity the tracking area of the second base station node; and (c) the packet core network entity receiving from a wireless terminal the tracking area for the second base station node when the wireless terminal performs a tracking area update in a cell served by the first base station node.

In an example implementation the list generation mode based on tracking area update (TAU) also comprises the first base station node conveying to the packet core network entity the tracking area of the first base station node and the cell type of the cell served by the first base station node; and the second base station node conveying to the packet core network entity the tracking area of the second base station node and the cell type of the cell served by the second base station node. For example, the method may comprise the either first base station node or the second base station node including the cell type of the cell served by the respective base station node as new information element(s) in a S1 SETUP REQUEST message.

In an example implementation of the list generation mode based on tracking area update (TAU), the method further comprises the packet core network entity obtaining the cell type of the cell served by either or both of the first base station node and the second base station node based on a preconfigured relation of cell type and other information. In various example implementations such other information may comprise at least one parameter such as tracking area, Physical Cell Identity (PCI), and E-UTRAN Cell Global Identity (E-CGI), or a range of values associated with one or more such parameter(s).

In an example implementation of the list generation mode based on tracking area update (TAU), the method further comprises (a) the packet core network entity receiving from a wireless terminal the tracking area of the second base station node as a last visited tracking area when the wireless terminal performs a tracking area update in a new tracking area, the new tracking area being the tracking area of the first base station node; (b) the packet core network entity generating the list to include both the last visited tracking area and the new tracking area if at least one of the last visited tracking area and the new tracking area are associated with a low power node. In a further implementation the method further comprises the optional act of (c) the packet core network entity sending the list to a wireless terminal situated in either the last visited tracking area or the new tracking area. The packet core network entity may also send the list to other terminals in the last visited tracking area.

In an example implementation of the list generation mode based on tracking area update (TAU), the method further comprises the packet core network entity using the last visited tracking area so that the packet core network entity can delete an old context for the wireless terminal (in an old packet core network entity).

In any of the embodiments and modes the heterogeneous radio access network may further comprises a third base station node which is a low power base station node. In such embodiments comprising three or more base station nodes the method further comprises the packet core network entity obtaining information a tracking area and a cell type for the third base station node; and the packet core network entity generating the list of tracking areas to further include the tracking area for the third base station node.

In an example embodiment and mode, the method further comprises the packet core network entity sending the list to a wireless terminal situated in either the tracking area of the first base station node or the tracking area of the second base station node. For example, in an example embodiment and mode the method further comprises the packet core network entity sending the list to a wireless terminal which performs a tracking area update in either the tracking area of the first base station node or the tracking area of the second base station node.

In an example embodiment and mode, the method further comprises a wireless terminal refraining from performing a normal tracking area update so long as the wireless terminal camps on a cell belonging to a tracking area on the list; or the wireless terminal being paged in all tracking areas included on the list.

In another of its aspects the technology disclosed herein concerns a method of operating a packet core network entity. In an example embodiment and mode the method comprises the acts of obtaining information regarding plural base station nodes of a heterogeneous radio access network and generating a list of tracking areas using the obtained information. The plural base station nodes comprise a first base station node and a second base station node, at least one of the first base station node and the second base station node being a macro base station node and another of the first base station node and the second base station node being a low power base station node. The act of obtaining the information comprises obtaining a tracking area for the first base station node; an indication of cell type for a cell served by the first base station node; a tracking area for the second base station node; and an indication of cell type for the cell served by the second base station node. The act of generating the list comprises using the indication of cell type for the first base station node and the indication of cell type for the low power base station node to generate the list. The list comprises the tracking area for the macro base station node and the tracking area for the low power base station node.

In an example embodiment and mode, the method of operating the packet core network entity node further comprises sending the list to a wireless terminal in one of the tracking areas on the list, e.g. sending the list to one or more wireless terminals in one or more tracking areas on the list. In an example implementation the method further comprises the packet core network entity, after and as a result of having sent the list, obtaining tracking area update information from the wireless terminal when the wireless terminal enters a cell that belongs to a tracking area not included on the list. Moreover, as a result of having sent the list, the packet core network entity may interact with the wireless terminal(s) in any one of the tracking areas on the list by considering the wireless terminal(s) to be in all the tracking areas on the list. In an example implementation such interacting with the wireless terminal comprises at least one of the following: permitting a wireless terminal to refrain from performing a normal tracking area update so long as the wireless terminal camps on a cell belonging to a tracking area on the list; and paging a wireless terminal in all tracking areas included on the list.

In an example list generation mode based on neighbor node-reporting, the method of operating the packet core network entity further comprises the packet core network entity receiving, from the first base station node, (1) the tracking area for the first base station node and an indication of cell type for the cell served by the first base station node; (2) the tracking area for the second base station node and an indication of cell type for a cell served by the second base station node.

In an example embodiment and mode, the method of operating the packet core network entity further comprises the packet core network entity receiving from the first base station node an indication of the cell type for the cell served by the first base station node in a S1 SETUP REQUEST message.

In an example embodiment and mode, the method of operating the packet core network entity further comprises the entity receiving, from the first base station node, the tracking area for the second base station node and the indication of the cell type for the cell served by the second base station node in an eNB CONFIGURATION UPDATE message.

In an example embodiment and mode, in the method of operating the packet core network entity the first base station node comprises the macro base station node and the second base station node comprises the low power base station node.

In another example embodiment and mode, in the method of operating the packet core network entity the first base station node comprises the low power base station node and the second base station node comprises the macro power base station node.

In an example list generation mode based on tracking area update (TAU), the method of operating the packet core network entity further comprises the packet core network entity receiving, from the first base station node, the tracking area for the first base station node; receiving from the second base station node the tracking area for the second base station node; and, the packet core network entity receiving from a wireless terminal the tracking area for the second base station node when the wireless terminal performs a tracking area update in a cell served by the first base station node.

In an example implementation of the list generation mode based on tracking area update (TAU), the method of operating the packet core network entity further comprises the packet core network entity determining the cell type of the cell served by either or both the first base station node and the second base station node based on a preconfigured relation of cell type and other information. In various example implementations such other information may comprise at least one parameter such as tracking area, Physical Cell Identity (PCI), and E-UTRAN Cell Global Identity (E-CGI), or a range of values associated with one or more such parameter(s).

In an example embodiment and mode of the method of operating the packet core network entity, the method further comprises the packet core network entity receiving from a wireless terminal the tracking area of the second base station node as a last visited tracking area when the wireless terminal performs a tracking area update in a new tracking area, the new tracking area being the first base station node; and the packet core network entity generating the list to include both the last visited tracking area and the new tracking area if at least one of the last visited tracking area and the new tracking area are associated with a low power node. In an example implementation, the method further comprises the optional act of the packet core network entity sending the list to a wireless terminal situated in either the last visited tracking area or the new tracking area.

In an example embodiment and mode of the method of operating the packet core network entity further comprises the packet core network entity using the last visited tracking area so that the packet core network entity can delete an old context for the wireless terminal (in an old packet core network entity).

In an example embodiment and mode of the method of operating the packet core network entity, the method further comprises the packet core network entity performing at least one of the following: permitting a wireless terminal to refrain from performing a normal tracking area update so long as the wireless terminal camps on a cell belonging to a tracking area on the list; paging a wireless terminal in all tracking areas included on the list.

In another of its aspects the technology disclosed herein concerns a method of operating a base station node of a heterogeneous radio access network. The heterogeneous radio access network comprises both a macro base station node and a low power base station node, with the method concerning operation of either the macro base station node or the low power base station node. In an example embodiment and mode the method comprises the base station node reporting a tracking area of the base station node to a packet core network entity and the base station node reporting an indication of type of cell served by the base station node to the packet core network entity. The indication of cell type indicates whether the cell served by the base station node is a macro cell or a low power cell.

In an example embodiment and mode the method of operating the base station further comprises (a) the base station node obtaining the tracking area of a second base station node and a cell type of a cell served by the second base station node; and (b) the base station node conveying the tracking area of the second base station node and the cell type of the cell served by the second base station node to the packet core network entity.

In an example implementation, the method of operating the base station further comprises the base station node using an existing automatic neighbor relation function to obtain from a wireless terminal the tracking area of the second base station node.

In an example implementation, the method of operating the base station further comprises the base station node including the tracking area of the second base station node and the cell type of the cell served by the second base station node as new information element(s) in an ENB CONFIGURATION UPDATE message.

In an example implementation, the method of operating the base station further comprises the base station node determining the cell type of the cell served by the second base station node based on a preconfigured relation of cell type and other information. In various example implementations such other information may comprise at least one parameter such as tracking area, Physical Cell Identity (PCI), and E-UTRAN Cell Global Identity (E-CGI), or a range of values associated with one or more such parameter(s).

In an example implementation, the first of the plural base station nodes comprises the macro base station node and the second of the plural base station nodes comprises the low power base station node.

In another example implementation the first of the plural base station nodes comprises the low power base station node and the second of the plural base station nodes comprises the macro power base station node.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 10A is a diagrammatic view illustrating the acts of FIG. 10 in an example scenario.

DETAILED DESCRIPTION

Figure 1:
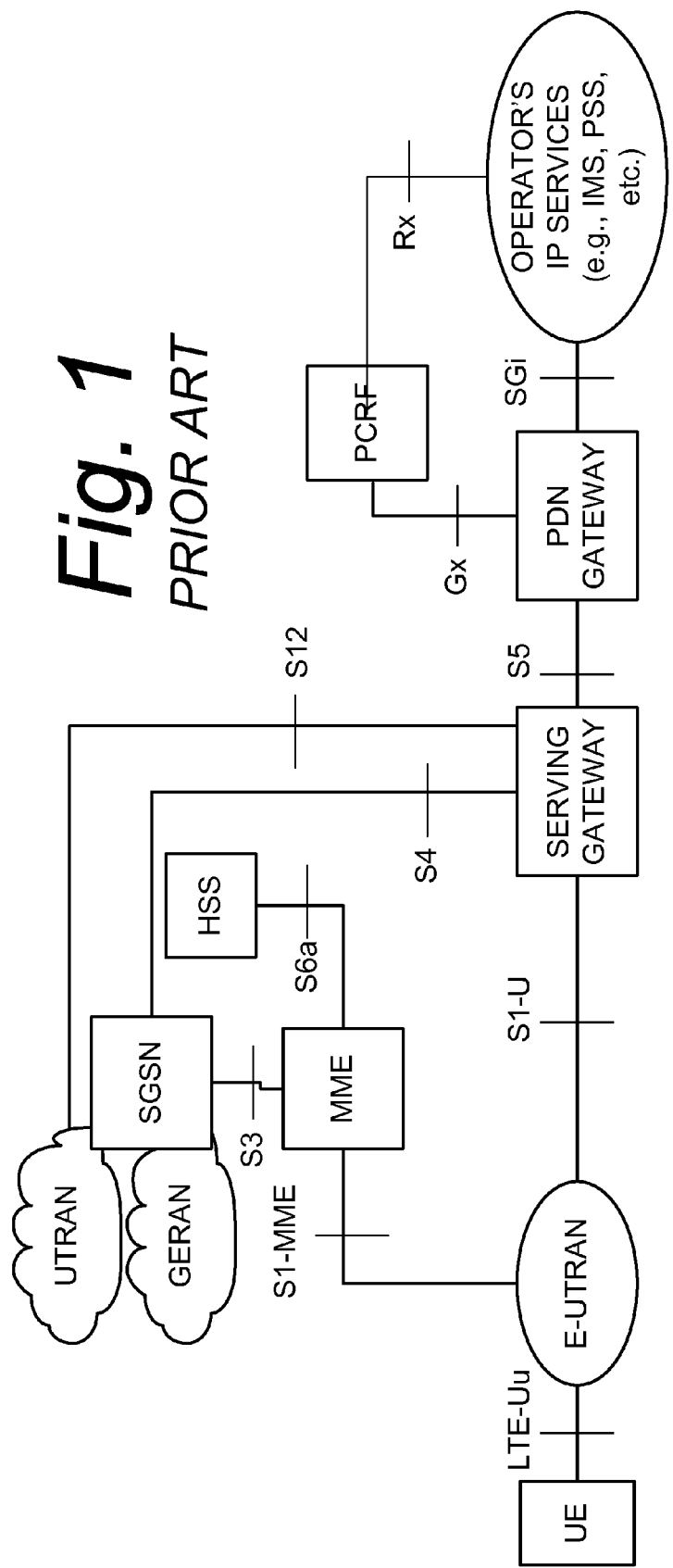
FIG. 1 is a diagrammatic view of non-roaming architecture for a Long Term Evolution (LTE)/System Architecture Evolution (SAE) network.
Figure 2:
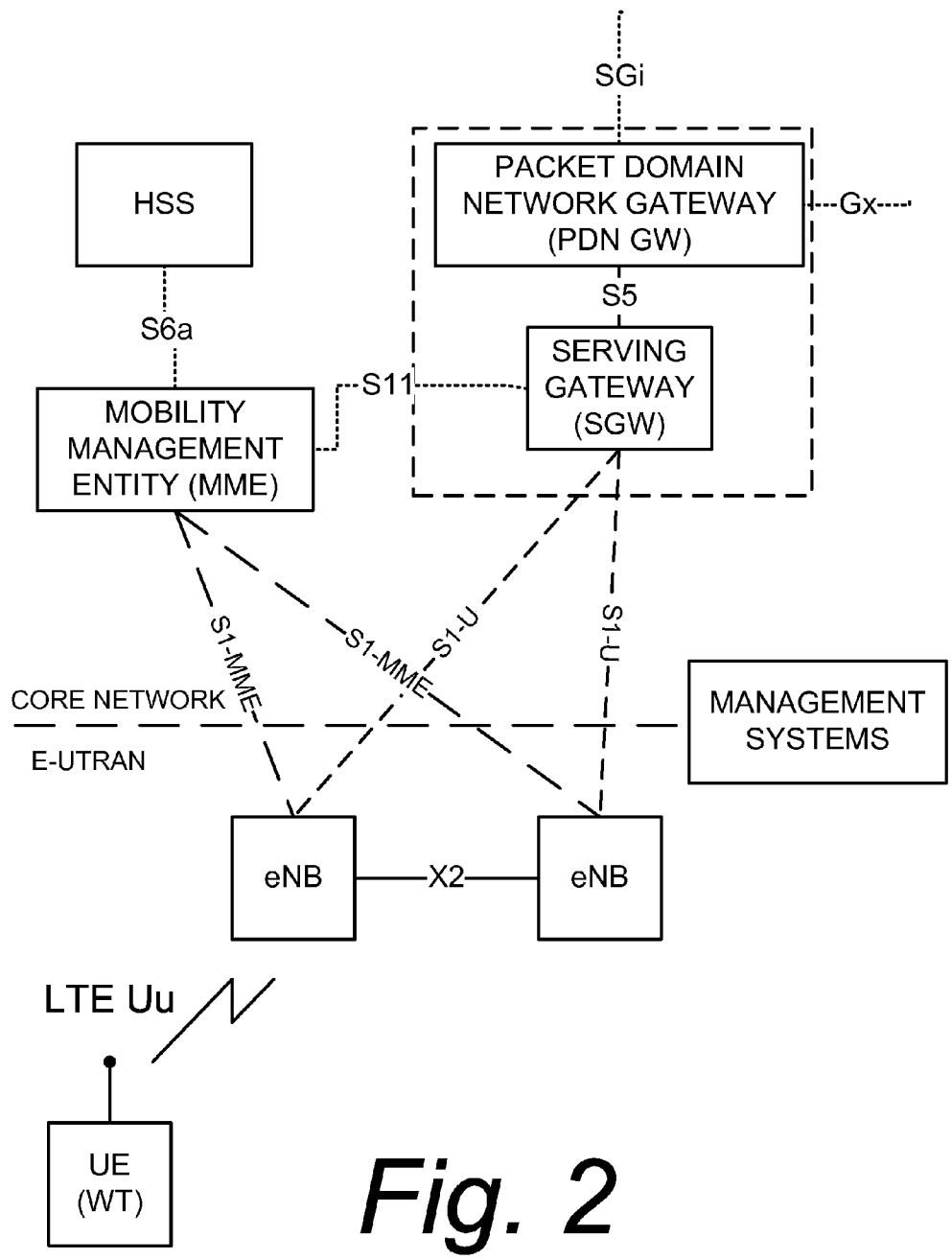
FIG. 2 is a diagrammatic view of a communications network comprising a mobile core network and an Evolved Universal Terrestrial Radio Access Network (E-UTRAN).
Figure 3:
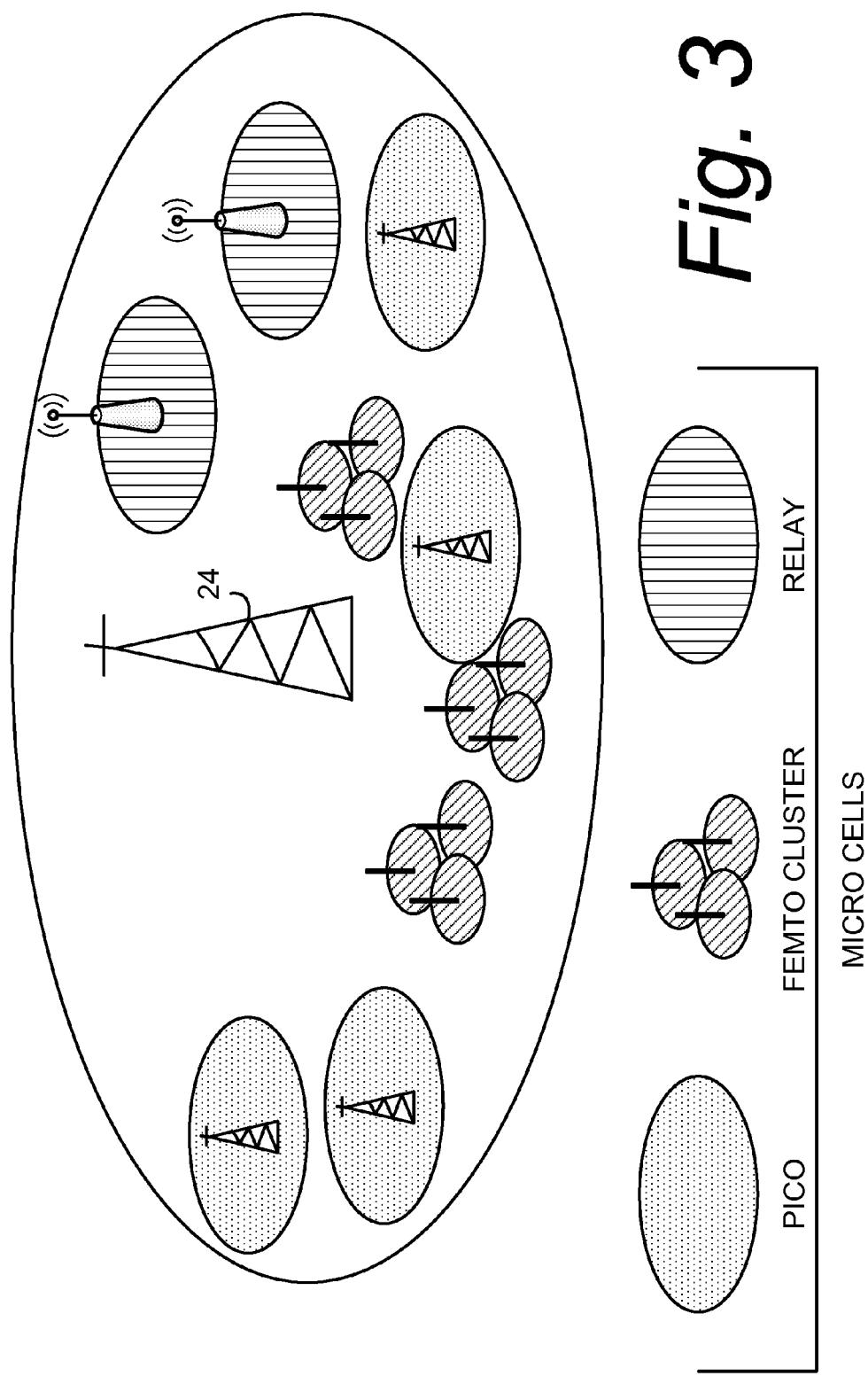
FIG. 3 is a diagrammatic view of portions of a heterogeneous radio access showing, e.g., example placement of different types of base stations.
Figure 4:
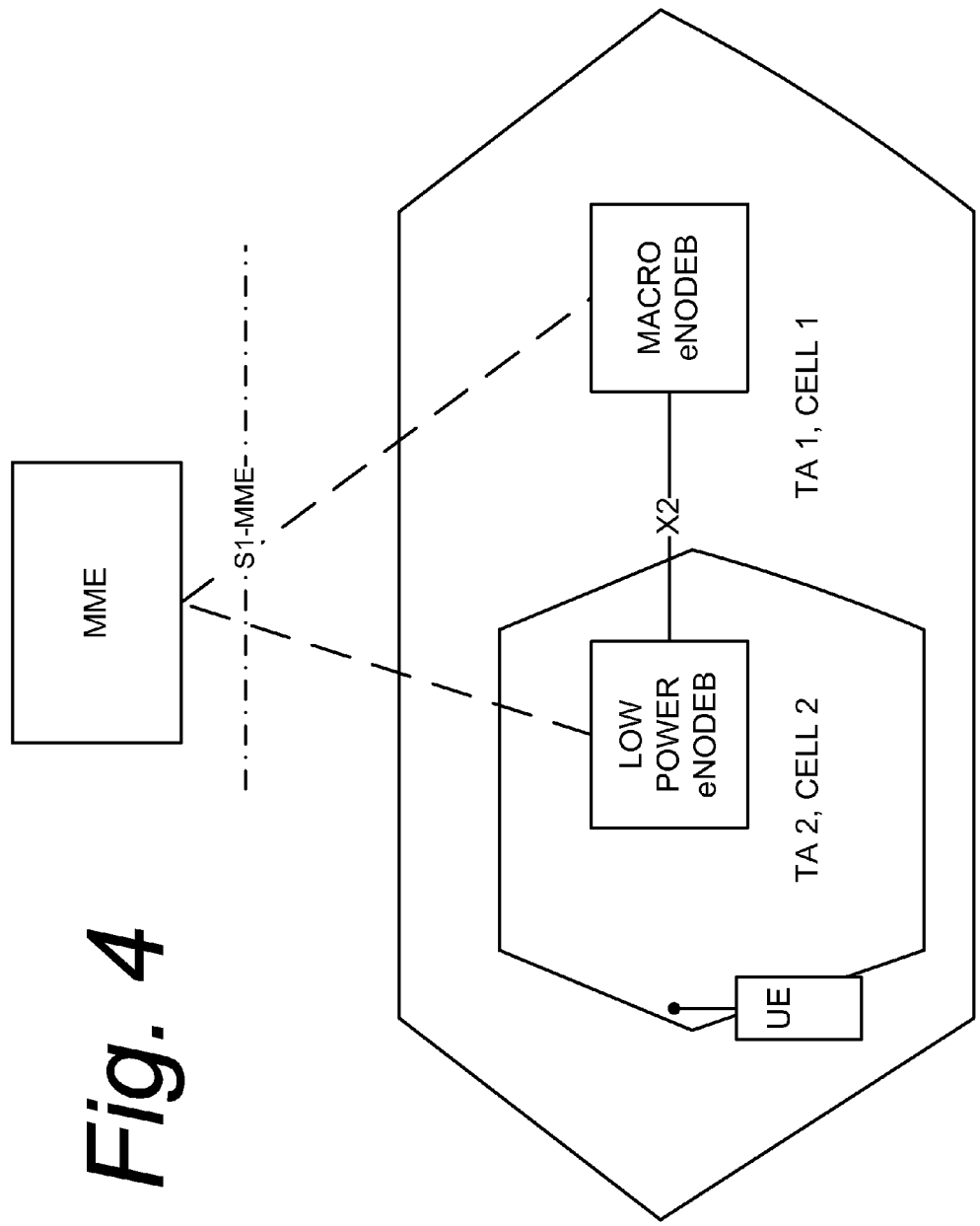
FIG. 4 is a diagrammatic view of portions of a heterogeneous radio access showing that coverage from a low power cell may provide a relatively small cell within a macro cell.

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

Figure 5:
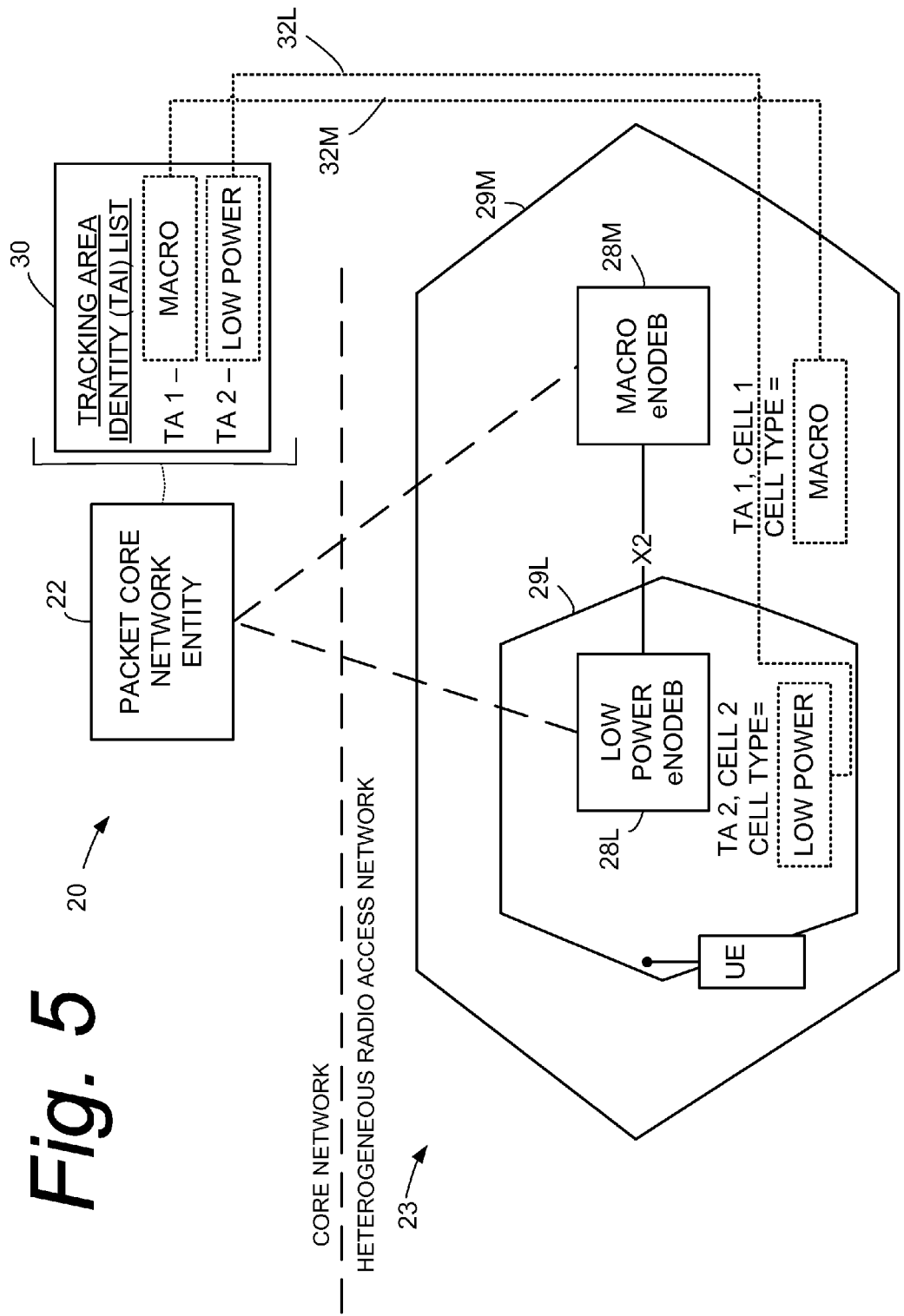
FIG. 5 is a diagrammatic view of portions of a communications network showing, e.g., a packet core network entity and portions of a heterogeneous radio access network according to an example embodiment and further illustrating one example relative positioning scenarios of a low power cell and a macro cell.

In one of its aspects the technology disclosed herein concerns a communications network 20 that comprises packet core network entity 22 and heterogeneous radio access network 23. The heterogeneous radio access network 23 comprises plural base station nodes 28, including at least one macro base station node 28M which serves macro cell 29M and at least one low power base station node 28L which serves low power cell 29L. As shown in FIG. 5, packet core network entity 22 is configured to generate a list 30 of tracking areas (e.g., a list of tracking area identities) using an indication 32M of cell type for the macro base station node 28M and an indication 32L of cell type for the low power base station node 28L. As shown in FIG. 5, the list 30 of tracking area identities 30 generated by the packet core network entity 22 comprises the tracking area for the macro base station node 28M and the tracking area for the low power base station node 28L. In being a list of tracking areas, the list 30 may be populated by tracking area identities (TAI) and may also be referred to as a TAI List. The term tracking area identity is understood with reference to 3GPP TS 23.401, which is incorporated herein by reference.

In an example embodiment such as that depicted in FIG. 5 the indication 32 of cell type indicates whether the cell served by the respective base station node is a macro cell or a low power cell, and thus correspondingly whether the base station node is a macro base station node or a low power base station node. By "low power" is meant the relative degree of transmission power of the respective base station node, e.g., the relative strength of signals emanating from the base station node. As a non-limiting example illustration, the indication of cell type may be configured as "very small"; "small"; "medium"; and "large". In such example illustration, as an example association scheme an indication of very small and an indication of small may reflect that the cell is served by a low power base station node, while an indication of medium and an indication of large may reflect that the cell is served by a macro base station node.

The list 30 is thus a multi-level list since the list includes indicators of tracking areas (e.g., tracking area identities) of cells of different cells types. For example, the different cell types include cells of different levels, such as a cell of the macro cell level on the one hand and a cell of a low power cell level on the other hand. What constitutes a "low power level" for any particular system or network is agreed in advance by functionalities of the network including packet core network entity 22, so that (for example) any base station node operating with a transmission power of X watts or greater may be classified as a macro base station node and any base station node operating a less than X watts may be classified as a low power base station node. In an example embodiment a "low power cell" is understood to encompass, for example, a femto cell, a pico cell, or a micro cell.

The fact that list 30 is a multi-level list, e.g., includes a tracking area for a macro base station node and a low power base station node, facilitates reduction of signaling in the heterogeneous radio access network 23. As explained herein, the packet core network entity 22 may send the list 30 to one or more wireless terminal(s) in any one tracking area on list 30. As a result of having sent the list to the wireless terminal, packet core network entity 22 may obtain tracking area update information from the wireless terminal when the wireless terminal enters a cell that belongs to a tracking area not included on the list. Moreover, as a result of having sent the list, the packet core network entity may interact with the wireless terminal(s) as if the tracking areas on the list were consolidated, e.g., by considering the wireless terminal(s) to be in all the tracking areas on the list. For example, interacting with the wireless terminal(s) may involve permitting the wireless terminal(s) to refrain from performing a normal tracking area update so long as the wireless terminal(s) camp(s) on a cell belonging to a tracking area on the list, or paging a wireless terminal(s) in all tracking areas included on the list.

As also explained herein, list 30 may be generated in different ways, e.g., in a list generation mode based on neighbor node-reporting and a list generation mode based on tracking area update (TAU). In at least some modes, such as the list generation mode based on neighbor node-reporting, the list is generated using at least some information reported by the base station node of a cell of one cell type (e.g., a first cell type reflecting a first cell level, such as a macro cell) pertaining to a neighbor base station node of a cell of another cell type (e.g., a second cell type reflecting a second cell level, such as a low power cell).

The macro base station node 28M and the one low power base station node 28L may have any of several possible locational or geographical relationships/scenarios. Typically and in an example embodiment and context of operation the cell 29L served by the low power base station node 28L is a neighbor to the macro cell 29M served by the macro base station node 28M. For example, the low power base station node 28L may be situated within a macro cell 29M served by the macro base station node 28M in an manner or scenario exemplified by FIG. 5.

Figure 5A:
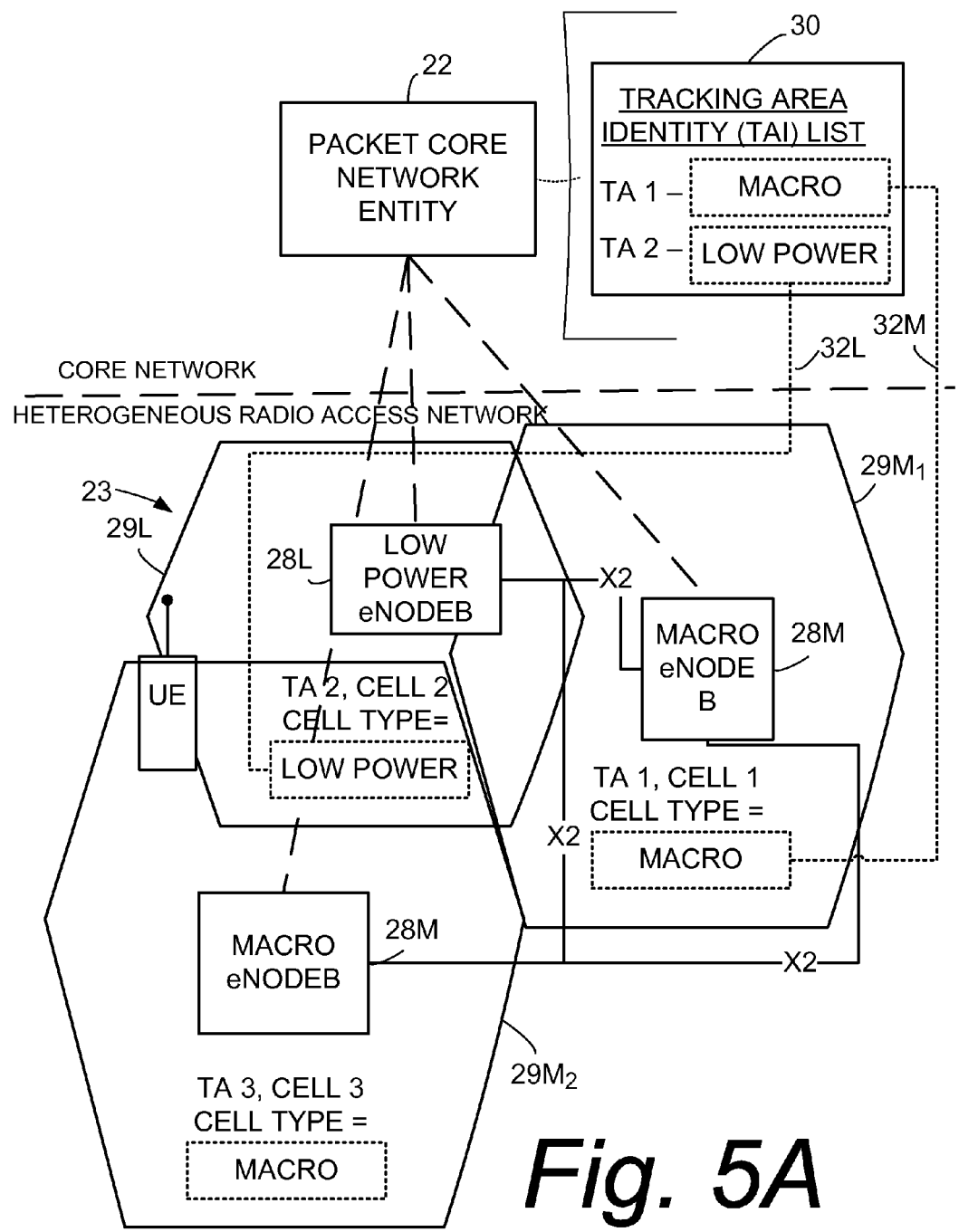
FIG. 5A and FIG. 5B are diagrammatic views of portions of communications networks and showing other example relative positioning scenarios of a low power cell and a macro cell.

As another example scenario illustrated in FIG. 5A, the low power base station node 28L may be situated on a border between two macro cells served by two respective macro base station nodes. In the particular example of FIG. 5A, coverage of the cell 29L served by the low power base station node 28L is partly overlapped by at least one of the two bordering macro cells $29M_1$ and $29M_2$, so that a wireless terminal may pick up signals from both the low power base station node 29L and at least one of the overlapping macro cells $29M_1$ and $29M_2$.

Figure 5B:
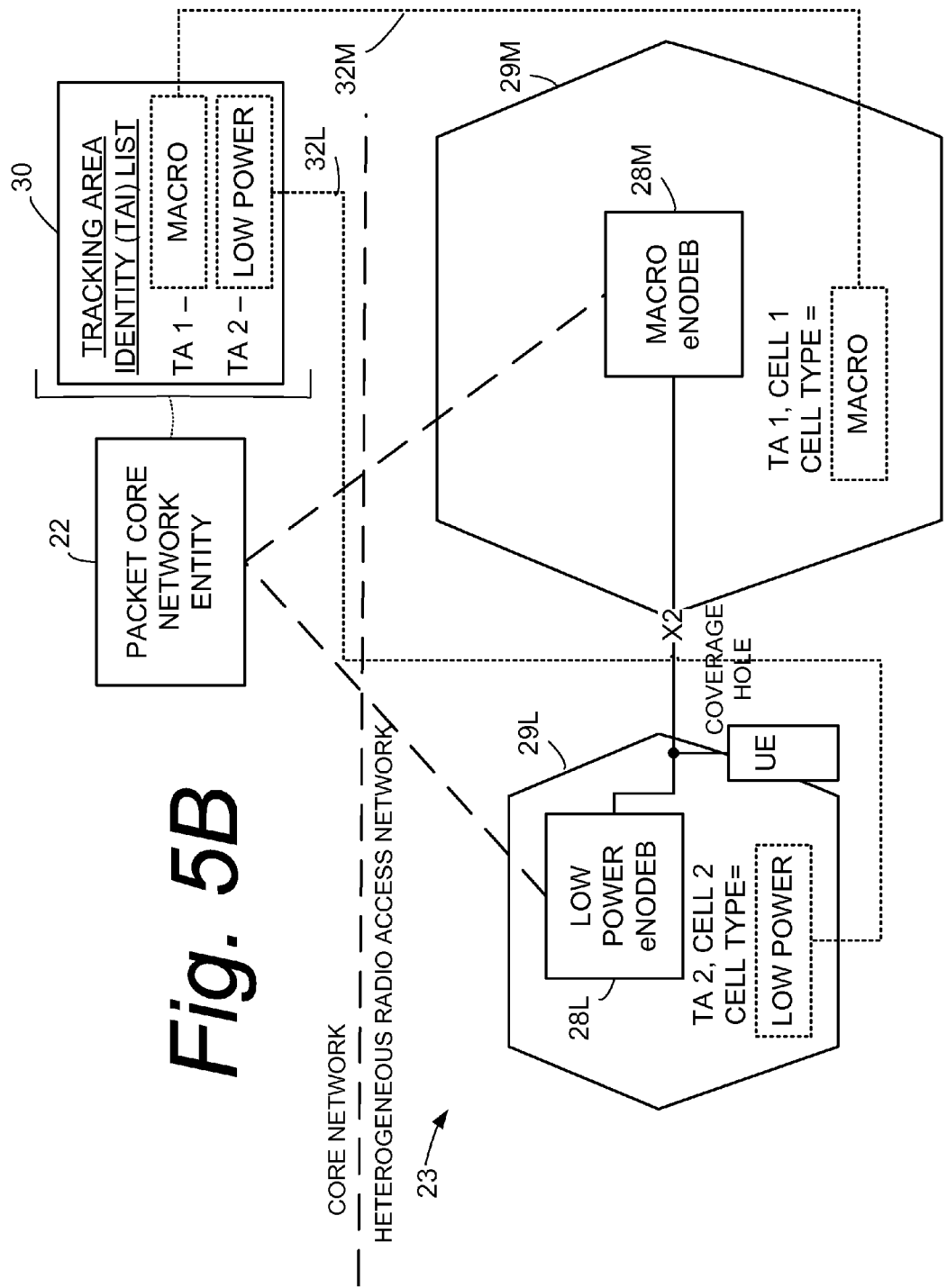

In still another example embodiment and environment illustrated in FIG. 5B, the low power base station node 28L and the macro base station node 28M do not need to have overlapping coverage, so that there can be a "hole" or area of no coverage between the low power base station node 28L and the macro base station node 28M.

Figure 6:
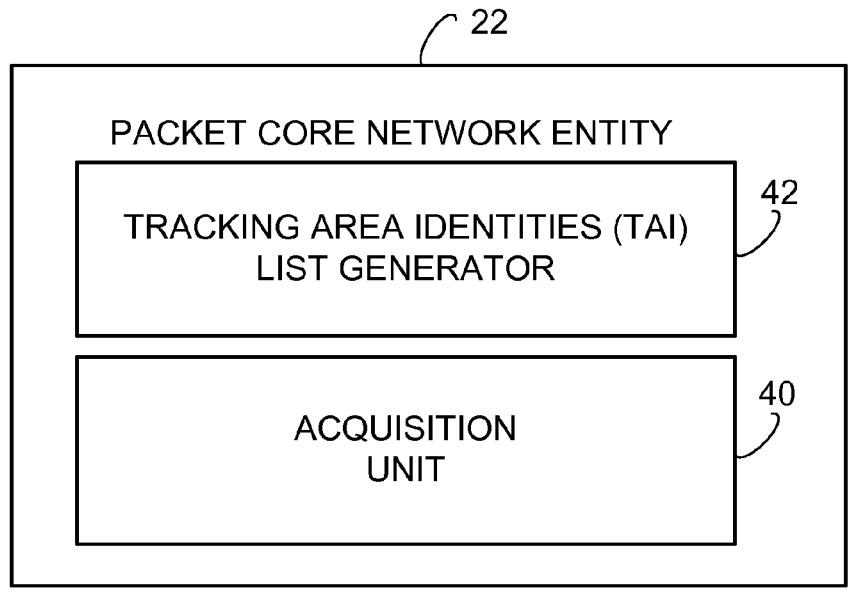
FIG. 6 and FIG. 6A-FIG. 6C are diagrammatic views of portions of packet core network entities according to differing example embodiments.

FIG. 6 shows a packet core network entity according to an example embodiment wherein packet core network entity 22 comprises acquisition unit 40 and list generator 42. The acquisition unit 40 is configured to obtain information regarding plural base station nodes 28 comprising the heterogeneous radio access network 23. As mentioned before, the plural base station nodes comprise a first base station node and a second base station node, at least one of the first base station node and the second base station node being a macro base station node 28M and another of the first base station node and the second base station node being a low power base station node 28L. The information obtained by the acquisition unit 40 comprises a tracking area for the first base station node; an indication of cell type for a cell served by the first base station node; a tracking area for the second base station node; and an indication of cell type for the cell served by the second base station node.

The list generator 42 is configured to generate a list of tracking areas using the indication of cell type for the first base station node and the indication of cell type for the low power base station node. The list 30 as formed by the list generator 42 comprises the tracking area for the first base station node and the tracking area for the second base station node, and thus includes the tracking areas for the macro base station node 28M and the low power base station node 28L.

In an example embodiment the packet core network entity is a mobility management entity (MME). In another example embodiment the packet core network entity comprises a pool of mobility management entities or portion(s) thereof. In another example embodiment the packet core network entity is a unit which operates under delegation or supervision of a mobility management entity (MME) or pool of mobility management entities, e.g., wherein the packet core network entity is a unit external to the mobility management entity (MME)/MME pool and which receives information from the mobility management entity (MME)/MME pool and then returns the list of tracking areas to the mobility management entity (MME)/MME pool. Use of the term "packet core network entity" is thus intended to encompass all such example embodiments. The connection of a mobility management entity (MME) to a base station node, whether a macro base station node or a low power base station node, is by a S1-MME interface.

Figure 6A:
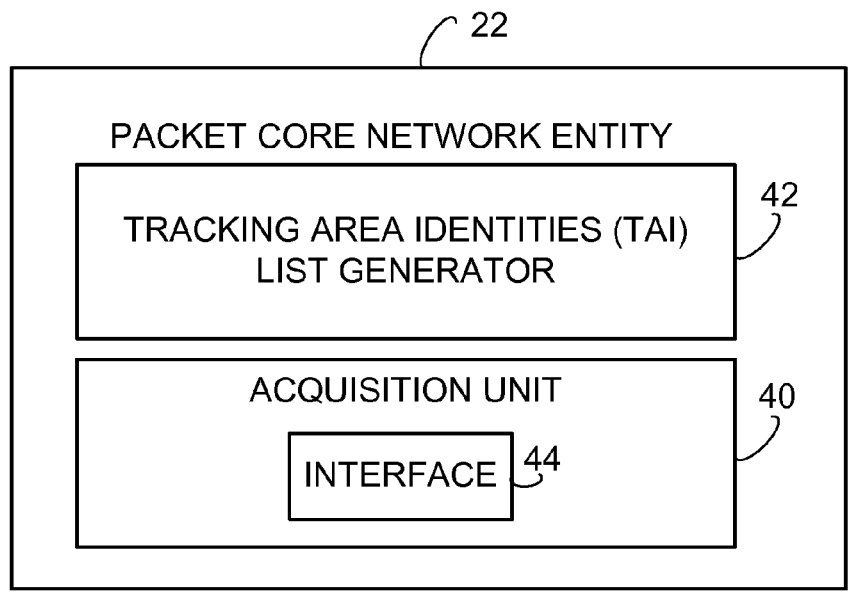

In an example embodiment of packet core network entity 22 illustrated in FIG. 6A, the acquisition unit 40 comprises an interface 44 that receives information from the heterogeneous radio access network 23. In such example embodiments the interface 44 receives the obtained information from the heterogeneous radio access network 23.

Figure 6B:
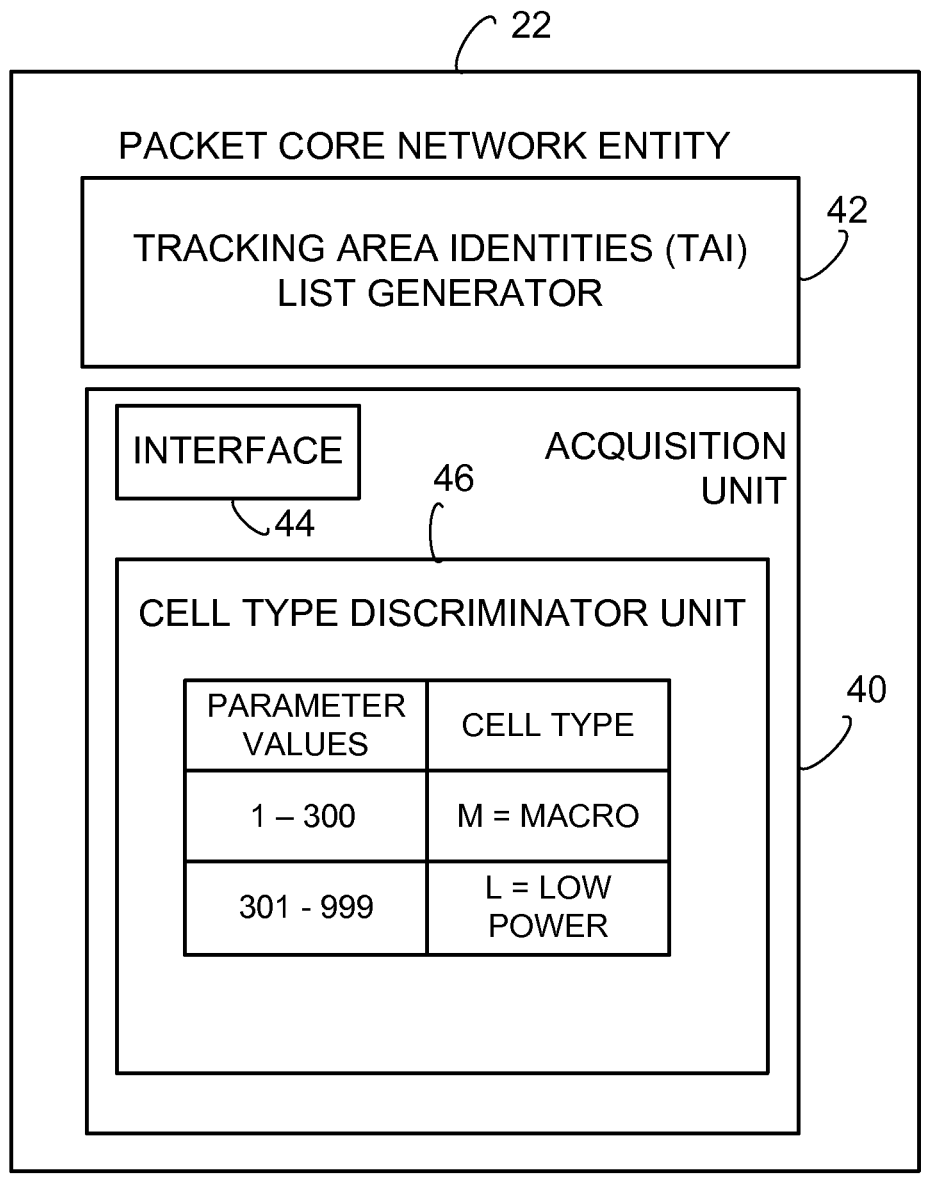

In other example embodiments of packet core network entity 22 such as that illustrated in FIG. 6B, the acquisition unit 40 comprises, in addition to the interface 44, a cell type discriminator 46. The cell type discriminator 46 is configured to determine the cell type of a cell served by the at least one of the plural base station node based on a preconfigured relation of cell type and other information. In various example implementations such other information may comprise at least one parameter such as tracking area, Physical Cell Identity (PCI), and E-UTRAN Cell Global Identity (E-CGI), or a range of values associated with one or more such parameter(s). For example, FIG. 6B shows that the cell type discriminator 46 comprises or has access to a table that associates ranges of a parameter (such as tracking area) with cell type (either macro (M) or low power (L)). In the particular situation shown in FIG. 6B, tracking area values in the range of 1-300 are associated with a macro cell type (M), while tracking area values in the range of 301-999 are associated with a low power cell type (L). It will be understood that comparable tables or relations can be constructed and/or stored with respect to parameters other than cell type. Moreover, in some situations a combination of parameters may be used to determine or index the cell type.

Figure 7:
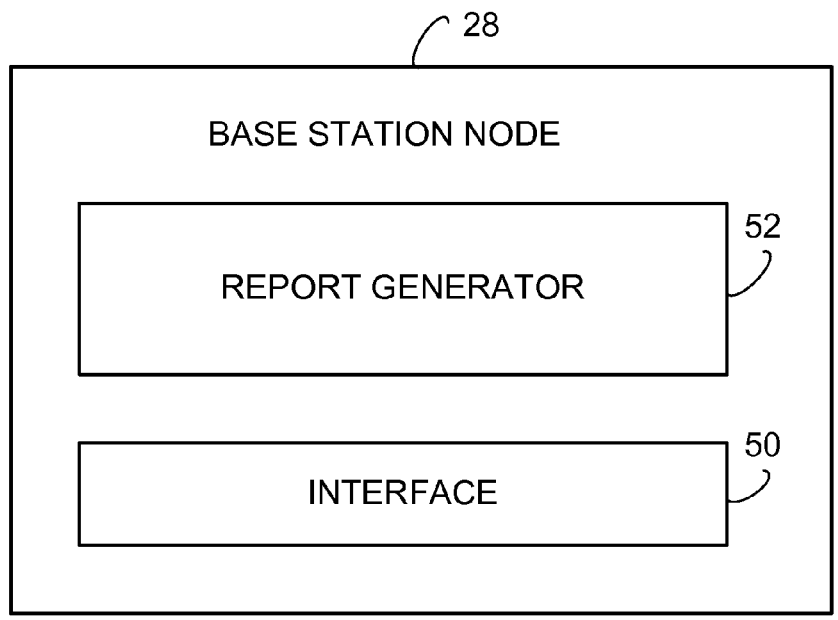
FIG. 7 and FIG. 7A-FIG. 7C are diagrammatic views of portions of base station nodes according to differing example embodiments.

FIG. 7 illustrates an example embodiment of a base station node 28 according to an example embodiment. The base station node 28 of FIG. 7 may be either a macro base station node 28M or a low power base station node 28L. The base station 28 comprises communications interface 50 and report generator 52. The communications interface 50 is configured to communicate information to packet core network entity 22. The report generator 52 is configured to include, in a message sent to the packet core network entity 22, a cell type identifier.

For example, in an example embodiment the cell type identifier reported by the report generator 52 of base station 28 is for a cell served by the base station node 28. Such message to the packet core network entity 22 (or another message generated by report generator 52 of base station node 28) may also include the tracking area for the cell served by the base station node 28. In the same or another example embodiment report generator 52 is further configured to report the cell type and tracking area for a cell served by another base station of the heterogeneous radio access network, e.g., a second base station node.

Figure 7A:
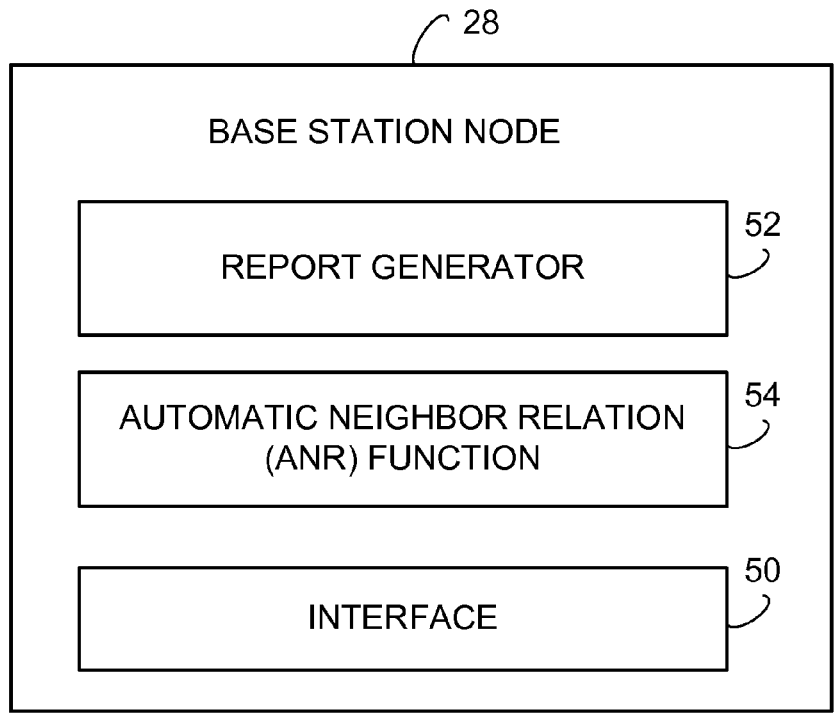

FIG. 7A illustrates an example embodiment of a base station node 28 which further comprises an automatic neighbor relation (ANR) function 54. As understood in the art and described herein to extent pertinent, the automatic neighbor relation (ANR) function 54 is used to obtain information such as tracking area and physical cell identity (PCI) of a newly detected neighbor base station. The automatic neighbor relation (ANR) function 54 may be used in a situation such as that illustrated in FIG. 5, e.g., when the low power base station node may be situated within a macro cell served by the macro base station node, or a situation such as that illustrate in FIG. 5A, e.g., when the low power base station node may be situated on a border between two macro cells served by two respective macro base station nodes, so that coverage of the cell served by the low power base station node is partly overlapped by at least one of the two bordering macro cell nodes. In both the FIG. 5 and FIG. 5A situations the wireless terminal may pick up signals from both the low power base station node and the overlapping macro base station node.

Figure 7B:
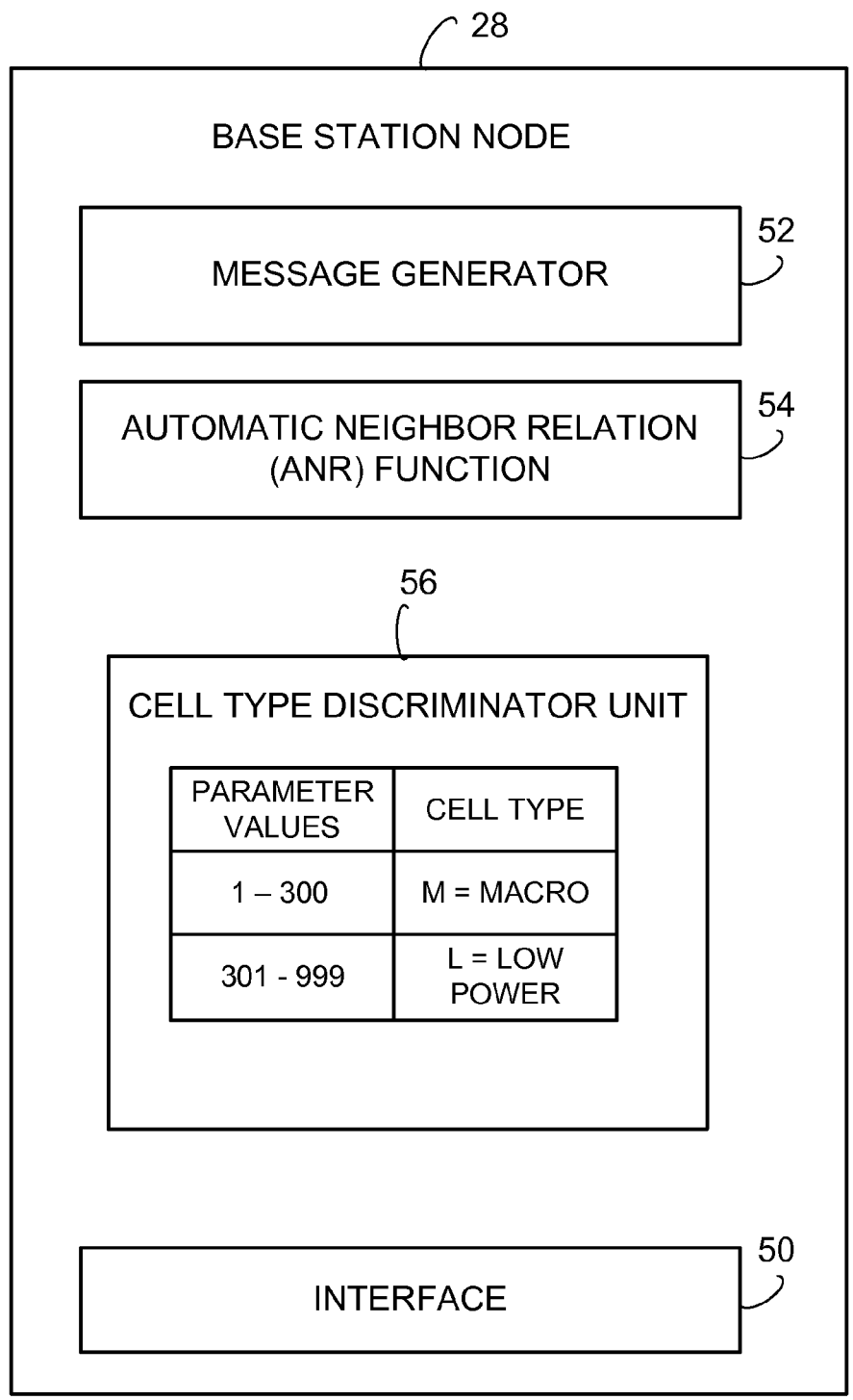

FIG. 7B illustrates an example embodiment of a base station node 28 which further comprises cell type discriminator 56. In similar manner as the cell type discriminator 46 of the packet core network entity 22, cell type discriminator 56 of base station node 28 is configured to determine cell type, but cell type of a cell served by another (e.g., neighbor) base station node based on a preconfigured relation of cell type and other information. In various example implementations such other information may comprise at least one parameter such as tracking area, Physical Cell Identity (PCI), and E-UTRAN Cell Global Identity (E-CGI), or a range of values associated with one or more such parameter(s). For example, FIG. 7B shows that the cell type discriminator 56 comprises or has access to a table that associates ranges of a parameter (such as tracking area) with cell type (either macro (M) or low power (L)). In the particular situation shown in FIG. 7B, tracking area values in the range of 1-300 are associated with a macro cell type (M), while tracking area values in the range of 301-999 are associated with a low power cell type (L). It will be understood that comparable tables or relations can be constructed and/or stored with respect to parameters other than cell type. Moreover, in some situations a combination of parameters may be used to determine or index the cell type.

Figure 8:
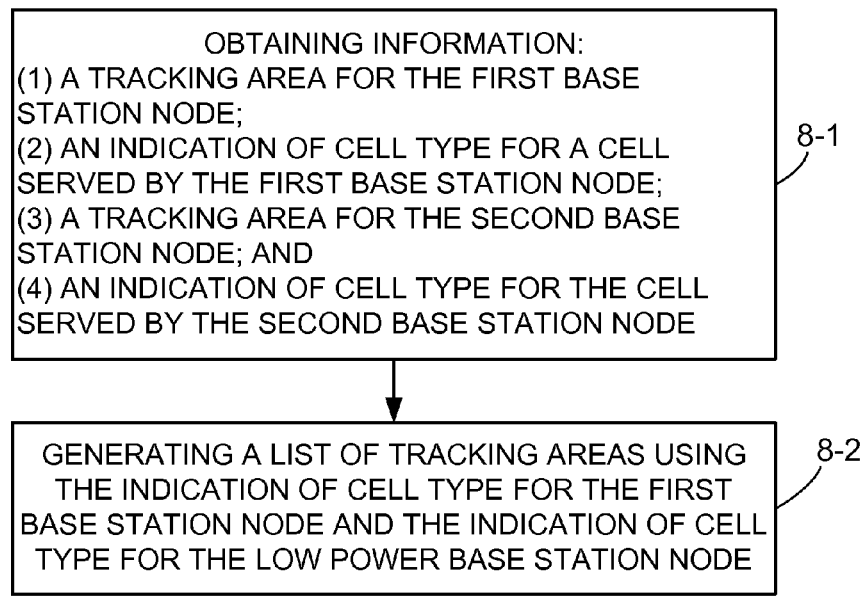
FIG. 8 is a flowcharting showing basic, representative acts or steps comprising a method of operating a communications network including generating a list of tracking area identities (TAI) according to an example embodiment and mode.

FIG. 8 illustrates example basic, representative acts or steps performed in conjunction with a method of operating a communications network. As understood from the foregoing, the network comprises a packet core network entity 22 and a heterogeneous radio access network 23, with the heterogeneous radio access network 23 comprising plural base station nodes 28 including a first base station node and a second base station node. At least one of the first base station node and the second base station node is the macro base station node 28M and another of the first base station node and the second base station node is the low power base station node 28L.

In the example embodiment and mode of FIG. 8, the method of operating the communications network comprises basic acts 8-1 through 8-2. Act 8-1 comprises the packet core network entity obtaining information, the obtained information comprising (1) a tracking area for the first base station node; (2) an indication of cell type for a cell served by the first base station node; (3) a tracking area for the second base station node; and (4) an indication of cell type for the cell served by the second base station node. Act 8-2 comprises the packet core network entity generating a list of tracking areas (e.g., list 30) using the indication of cell type for the first base station node and the indication of cell type for the second base station node. The list 30 thus comprises the tracking area for the macro base station node and the tracking area for the low power base station node. Thus, as understood from, e.g., FIG. 8, the E-UTRAN (e.g., a base station node 28 such as an eNB) automatically provides information to the evolved packet core (e.g., packet core network entity 22, which may be a mobility management entity (MME). The information is used by the packet core network entity 22 to automatically build the TAI List (list 30) which includes tracking areas (e.g., tracking area identities [TAIs]) for both the low power cells (low power cell 29L) and macro cells (e.g., macro cell 29M).

Figure 8A:
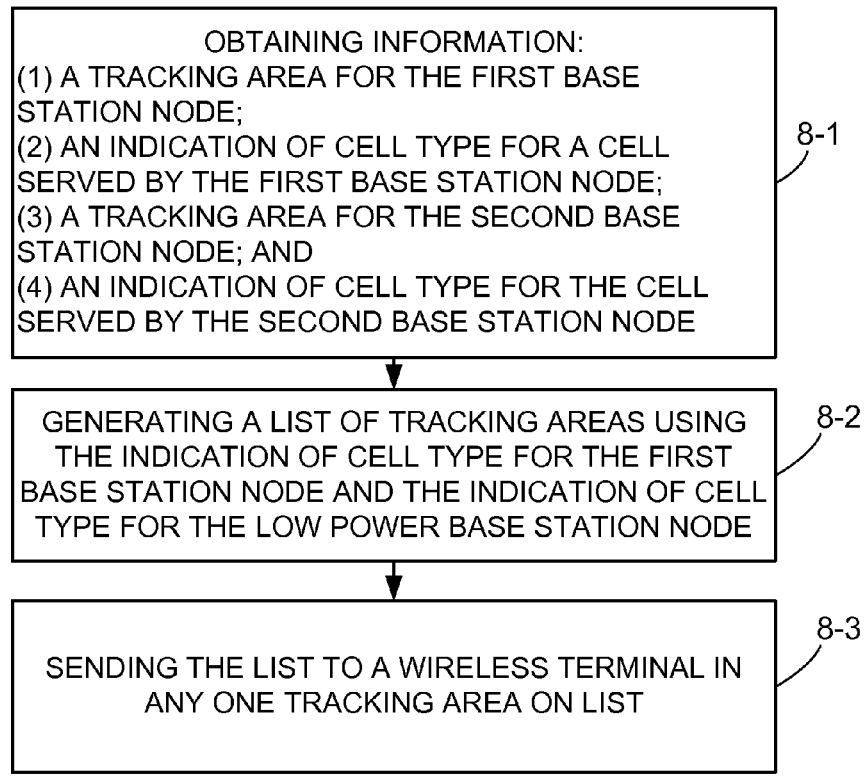
FIG. 8A is a flowcharting showing basic, representative acts or steps comprising a method of operating a communications network including generating a list of tracking area identities (TAI) according to another example embodiment and mode

FIG. 8A depicts yet a further act in an example embodiment and mode of the method of operating the communications network, e.g., act 8-3. Act 8-3 comprises the packet core network entity sending the list 30 to a wireless terminal in any one tracking area on list 30. In fact, the packet core network entity 22 may send the list 30 to one or more wireless terminals in any one or more of the tracking areas on list 30. In an example implementation the method further comprises the packet core network entity, after and as a result of having sent the list, obtaining tracking area update information from the wireless terminal when the wireless terminal enters a cell that belongs to a tracking area not included on the list (but not obtaining tracking area update information when the wireless terminal enters a cell that belongs to a tracking area that is included on the list). Moreover, as a result of having sent the list, the packet core network entity may interact with the wireless terminal(s) as if the tracking areas on the list were consolidated, e.g., by considering the wireless terminal(s) to be in any of the tracking areas on the list. For example, interacting with the wireless terminal may comprise permitting a wireless terminal to refrain from performing a normal tracking area update so long as the wireless terminal camps on a cell belonging to a tracking area on the list, or paging a wireless terminal in all tracking areas included on the list. Thus, act 8-3 may comprise providing or sending the list 30 to a wireless terminal(s) in a cell whose tracking area is included on the list 30, e.g., so that the wireless terminal(s) will know that it does not need to perform a normal tracking area update so long as the wireless terminal remains in a cell belonging to a tracking area on list 30.

In generating and using the list 30 in the aforementioned manner, the method of operating the communications network (and other methods described herein) offer significant advantage by, e.g., reducing the signaling that otherwise would be involved without such a multi-level list 30. For example, in view of the existence of the multi-level list 30 and being authorized to refrain from performing a normal tracking area update so long as the wireless terminal camps on a cell belonging to a tracking area on the list, the wireless terminal avoids further signaling that would be required if the wireless terminal were otherwise required to perform a tracking area update (TAU) when moving from one cell on the list to another cell on the list.

The method of operation the network includes several example embodiments and modes, including a list generation mode based on neighbor node-reporting and a list generation mode based on tracking area update (TAU). In the list generation mode based on neighbor node-reporting, either a macro base station node (eNB) reports information about a low power neighbor cell (macro reporting scenario), or a low power base station node reports information about a macro cell (low power reporting scenario). In the list generation mode based on tracking area update (TAU), either an update in low power base station node scenario or an update in macro base station node scenario may be implemented.

In the macro reporting scenario of the list generation mode based on neighbor node-reporting, the macro base station node 28M informs the packet core network entity 22 (e.g., mobility management entity (MME)) about the tracking area for the low power base station node 28L that is in macro coverage, e.g., a low power node that can be detected by the macro base station node that is providing the report. Based on the information received from the reporting macro base station node 28M, the packet core network entity 22 proactively constructs and provides a TAI list 30 to wireless terminals which are in the macro coverage, e.g., the wireless terminals served by or within macro cell 29M. In fact, in an example implementation the packet core network entity 22 may send the list 30 to all wireless terminals in the low power cell 29L. The TAI list 30 comprises both the tracking area for the macro base station node 28M and the tracking area for the low power base station node 28L.

Alternatively, in the low power reporting scenario of the list generation mode based on neighbor node-reporting, the low power node 28L informs the packet core network entity 22 (e.g., mobility management entity (MME)) about the presence of the low power base station node 28L in a macro cell (e.g., provides the tracking area identity of the macro cell in which the low power base station node 28L is located) so that the packet core network entity 22 can construct and provide the TAI list 30 to wireless terminals in the low power cell 29L. In an example implementation the packet core network entity 22 may send the list 30 to all wireless terminals in the macro cell 29M.

Figure 9:
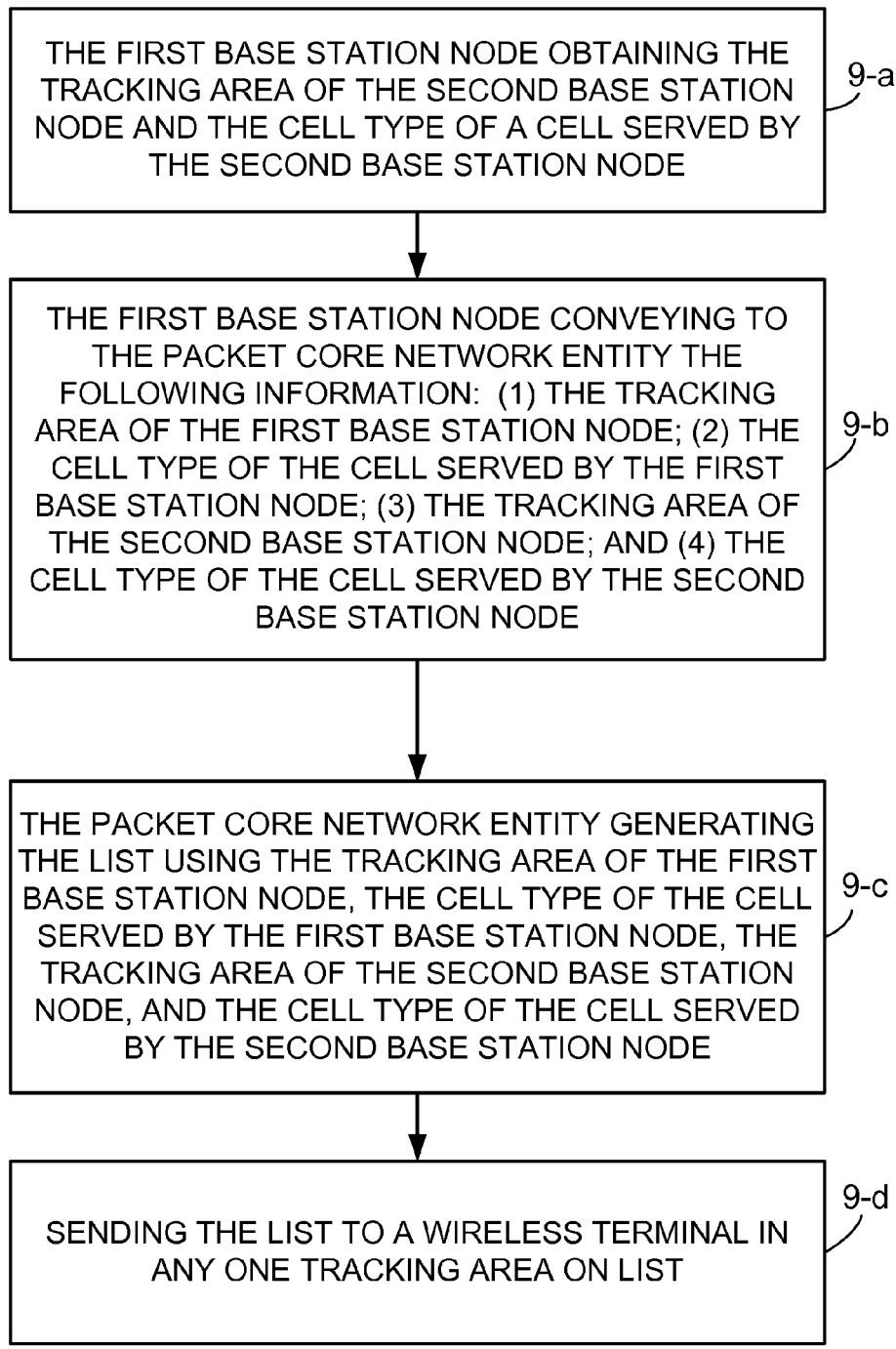
FIG. 9 is a flowcharting showing basic example, representative acts or steps comprising a list generation mode of the network operation method based on neighbor node-reporting.

FIG. 9 shows example, representative acts or steps comprising the list generation mode of the network operation method based on neighbor node-reporting. In FIG. 9 the terminology "first base station node" and "second base station node" is utilized. Whether the macro base station node or the low power base station node qualifies for either the first base station node or the second base station node depends on which of two particular scenarios is of interest.

Act 9-a comprises the first base station node obtaining the tracking area of the second base station node and the cell type of a cell served by the second base station node. Act 9-b comprises the first base station node conveying to packet core network entity 22 the following information: (1) the tracking area of the first base station node; (2) the cell type of the cell served by the first base station node; (3) the tracking area of the second base station node; and (4) the cell type of the cell served by the second base station node. Act 9-c comprises the packet core network entity 22 generating the list 30 using the tracking area of the first base station node, the cell type of the cell served by the first base station node, the tracking area of the second base station node, and the cell type of the cell served by the second base station node. For example, act 9-c may comprise the packet core network entity 22 generating list 30 (using the tracking area of the first base station node and the tracking area of the second base station node) if the cell types of the cell served by the first base station node and the cell type of the cell served by the second base station node are different. Act 9-d comprises the packet core network entity 22 sending the list 30 to a wireless terminal in any one tracking area on list 30. Thereafter the packet core network entity 30 may obtain tracking area update information from the wireless terminal when the wireless terminal enters a cell that belongs to a tracking area not included on the list (but not obtain the tracking area update information when the wireless terminal enters a cell that belongs to a tracking area that is included on the list). Moreover, as a result of having sent the list, the packet core network entity and the wireless terminal may interact as if the tracking areas on the list were consolidated, e.g., by considering the wireless terminal to be in any of the tracking areas on the list (as in the manner of previously described act 8-3). Thus, act 9-d may comprise permitting a wireless terminal to refrain from performing a normal tracking area update so long as the wireless terminal camps on a cell belonging to a tracking area on the list, or paging a wireless terminal in all tracking areas included on the list. Act 9-d may include the packet core network entity 22 providing or sending the list 30 to one or more wireless terminal(s) in one or more cells whose tracking areas are included on the list 30.

Figure 9A:
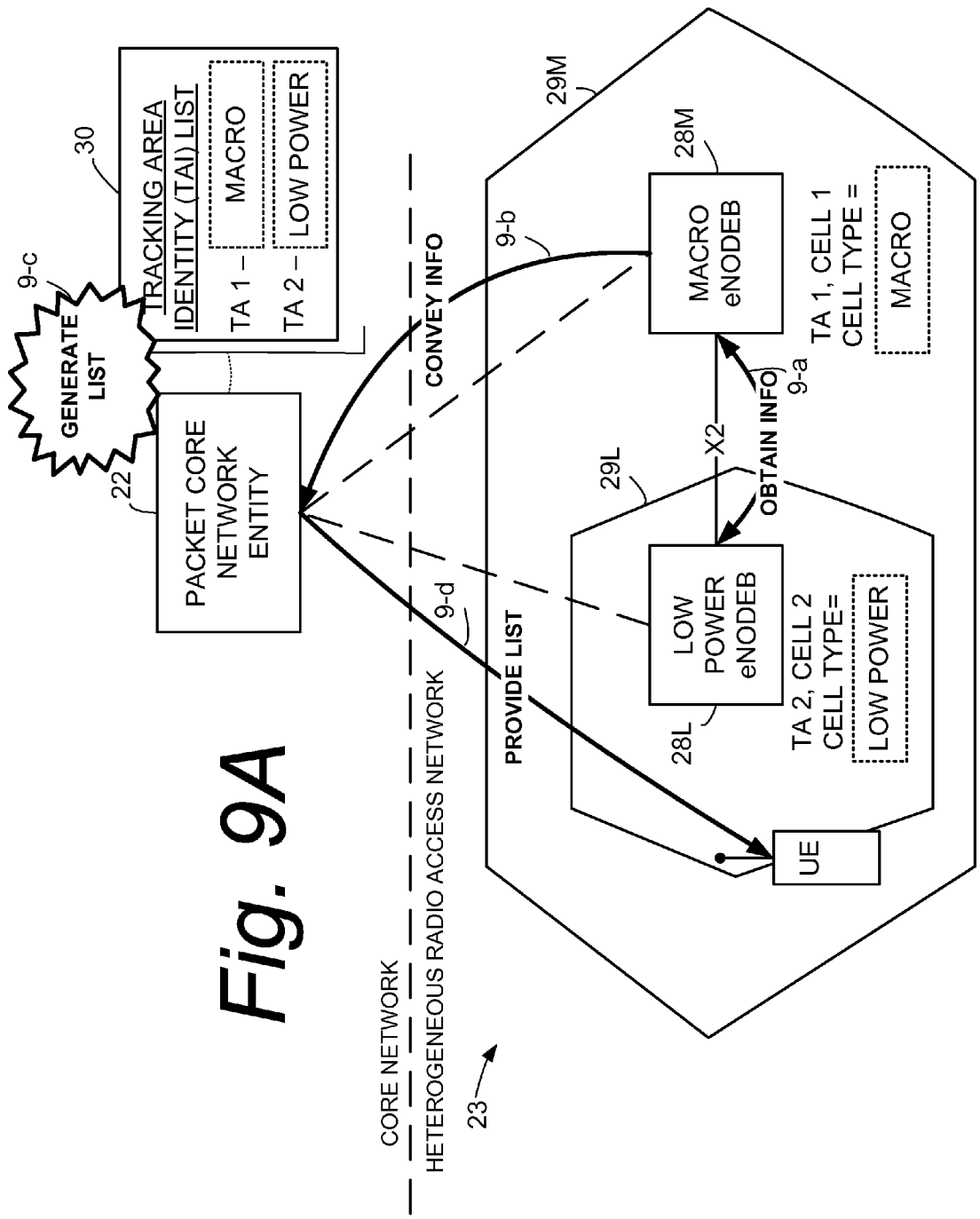
FIG. 9A is a diagrammatic view illustrating the acts of FIG. 9 in the macro reporting scenario.
Figure 9B:
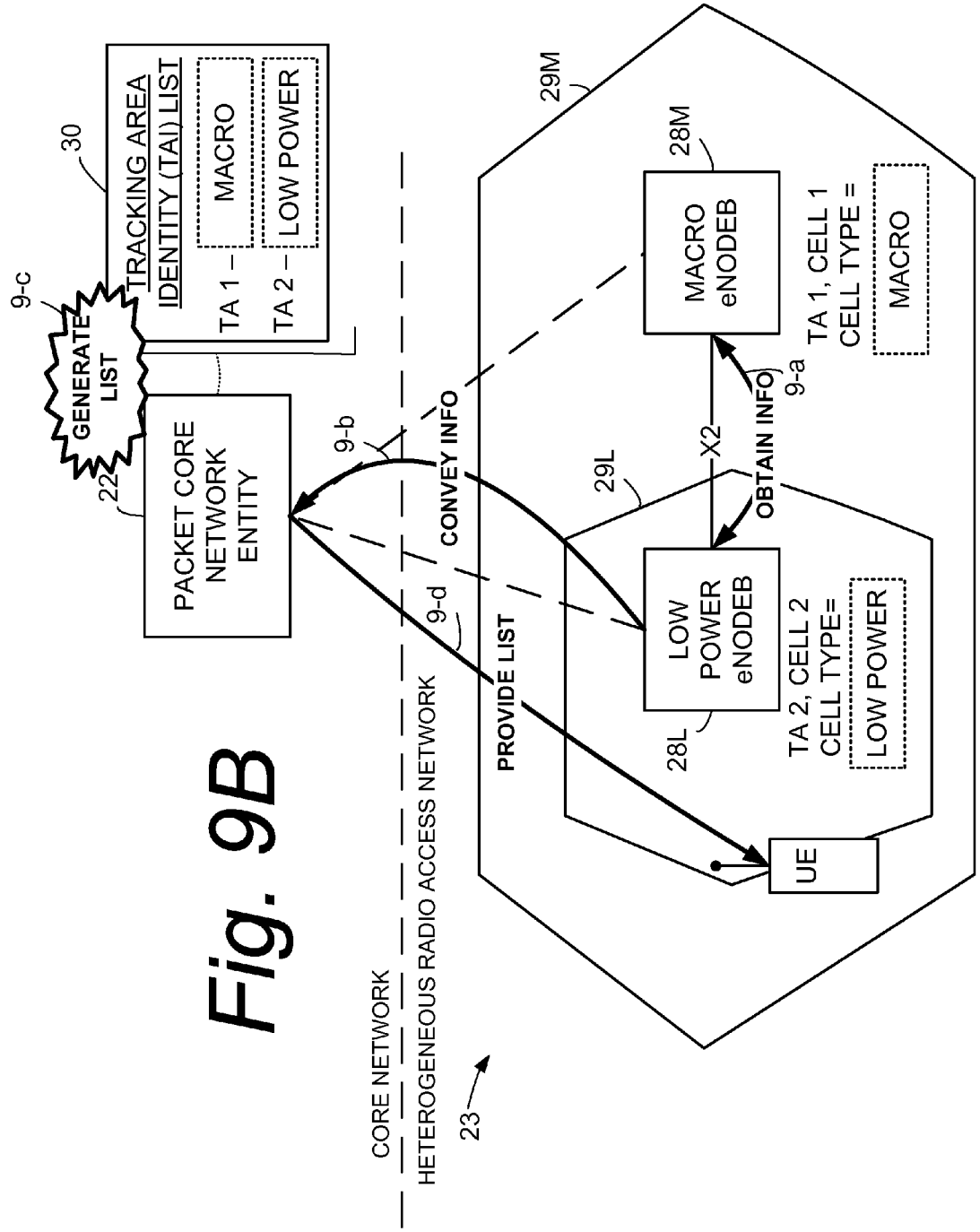
FIG. 9B is a diagrammatic view illustrating the acts of FIG. 9 in a low power reporting scenario.

FIG. 9A illustrates the acts of FIG. 9 in the macro reporting scenario. In the macro reporting scenario the macro base station node is the first base station node and the low power base station node is the second base station node. Conversely, FIG. 9B illustrates the acts of FIG. 9 in the low power reporting scenario. In the low power reporting scenario the low power base station node is the first base station node and the macro base station node is the second base station node.

Obtaining the tracking area of the second base station node as included in act 9-a may comprise the first base station node using an existing automatic neighbor relation function to obtain from a wireless terminal the tracking area of the second base station node. For example, an existing Automatic Neighbor Relation (ANR) function is used to report tracking area, Physical Cell Identity (PCI) and other information for a newly detected neighbor.

The Automatic Neighbor Relation (ANR) function is described in 3GPP TS 36.300, which is incorporated herein by reference in its entirety including but not limited to FIG. 22.3.3-1 of 3GPP TS 36.300. In essence, the ANR function of the reporting cell instructs a wireless terminal to perform measurements on neighbor cells. The wireless terminal sends a measurement reporting regarding, e.g., the cell served by the second base station node. The measurement report from the wireless terminal may include the PCI of the cell served by the second base station node, but not its ECGI. Using the PCI as a parameter, the first base station node then instructs the wireless terminal to read the ECGI, the tracking area, and all available PLMN identifiers of the cell served by the second base station node. The wireless terminal then reports the parameters read regarding the cell served by the second base station node to the first base station node. The first base station node then may add this "neighbor relation" to a neighbor relation list maintained by the first base station node, and if desired can set up a new X2 interface to the second base station node. As mentioned above, the automatic neighbor relation (ANR) function can be usefully employed in situations such as those of FIG. 5 and FIG. 5A, for example.

Obtaining the cell type of the second base station node as included in act 9-a may comprise the first base station node determining the cell type of the cell served by the second base station node based on a preconfigured relation of cell type and other information, using the cell type discriminator 56 of FIG. 7B as earlier described. In an example implementation such other information may comprise at least one parameter such as tracking area, Physical Cell Identity (PCI), and E-UTRAN Cell Global Identity (E-CGI), or a range of values associated with one or more such parameter(s). In other words, the base station node 28 could have knowledge enough to determine 'cell type' for the neighbor, e.g., there may be a partitioning of PCIs or tracking areas in the network so that, for example, low power nodes use a certain range and macro nodes use another range. This information may be configured in the base station node 28, for example. Alternatively, the base station node 28 may be able to query or poll another entity for a key or table that relates cell type to another parameter which the base station node 28 can obtain.

As mentioned above, act 9-*b* comprises the first base station node conveying information to packet core network entity 22. The information conveyed in act 9-*b* can be conveyed to the packet core network entity 22 over an interface such as the S1-MME interface in a message such as an S1 message, e.g., S1 messages such as an eNB CONFIGURATION UPDATE message. In this regard, as one aspect of the technology disclosed herein such messages (e.g., S1 messages) may be enhanced to convey information about the neighbor node tracking area and 'cell type'. That is, additional field(s)/information element(s) may be added to the messages, or other/vacant field(s)/information element(s) utilized by mutual agreement to accommodate the new information of neighbor node tracking area and cell type.

Act 9-*c* essentially comprises the packet core network entity 22 using logic of the packet core network entity 22 to generate, construct, or form the TAI list 30. The list 30 is generated using, e.g., the information received in act 9-*b*. The list generation procedure and thus the list 30 is enhanced to take into consideration the 'cell type' parameters for the involved base stations.

Act 9-*d* essentially comprises the packet core network entity 22 sending the list 30 to a wireless terminal in any one tracking area on list 30. As mentioned previously, sending the list 30 to a wireless terminal on the list enables the packet core network entity 22 to obtain tracking area update information from the wireless terminal when the wireless terminal enters a cell that belongs to a tracking area not included on the list. Moreover, as a result of having sent the list, the packet core network entity may interact with the wireless terminal as if the tracking areas on the list were consolidated, e.g., by considering the wireless terminal to be in all the tracking areas on the list. Act 9-*d* may include the packet core network entity 22 providing or sending the list 30 to one or more wireless terminals(s) in one or more cell(s) whose tracking areas are included on the list 30. To this end, in an example embodiment packet core network entity 22 includes logic that authorizes (1) communication with wireless terminals that perform a tracking area update in any one of the cells listed on the list 30 so that such wireless terminals are configured with the list 30, and/or (2) that wireless terminals in any tracking area of the list 30 be paged in all tracking areas included on the list 30. For example, pursuant to act 9-*d*, a wireless terminal entering tracking area TA 1 in FIG. 9A, for example, would (at direction, authorization, or initiation of packet core network entity 22) be configured with a TAI list 30 which comprises both tracking area TA1 and tracking area TA2. Thus, in an example embodiment and mode, the method comprises the packet core network entity 22 sending the list 30 to a wireless terminal which performs a tracking area update in either the tracking area of the first base station node or the tracking area of the second base station node.

In the list generation mode based on tracking area update (TAU), the packet core network entity 22 (e.g., logic of a mobility management entity (MME)) generates the list 30 upon realization that two cells are eligible for inclusion by virtue of a wireless terminal performing a tracking area update, and so that the packet core network entity 22 is provided with the tracking areas of the two cells in as part of the tracking area update. The wireless terminal provides the Last Visited TAI. The current TAI is received from the base station serving the current cell where the terminal performs the TAU. The terminal creates the TRACKING AREA UPDATE message and this message includes the last visited TAI. When the base station forwards the TAU towards the packet core network entity 22, the whole TAU is included unmodified as an information element in the S1AP INITIAL UE MESSAGE. Another information element in this S1AP message is the current/new TAI. In one example implementation of the list generation mode based on tracking area update (TAU) the packet core network entity 22 stores information received from base station nodes (e.g., eNBs) about the 'cell type'. For example, both macro eNBs and low power eNBs report the "cell type" and associated TAI(s) served by the eNB. In another example implementation the packet core network entity 22 ascertains the cell types based on preconfiguration, as herein described.

In the above regard, when a wireless terminal performs a tracking area update (TAU), the packet core network entity 22 looks at the "Last visited registered TAI" information provided by the wireless terminal in a tracking area update message. That tracking area update message is included e.g. in a S1AP INITIAL UE MESSAGE between the base station and the packet core network entity and the S1AP INITIAL UE MESSAGE also includes the tracking area of the base station node of the cell to which the wireless terminal has just moved. In receiving the tracking areas of two cells in such manner (e.g., via the tracking area update), and realizing that the two cells are of different types (e.g., one cell is a low power cell and the other cell is a macro cell), the packet core network entity 22 realizes the differing-level relation between the two cells and accordingly builds the TAI list 30 to include the tracking area of the first base station node and the tracking area of the second base station node. Thus, in discovering the relation (e.g. different cell types) of the cells served by the first base station node and the second base station node, the packet core network entity 22 is triggered to generate the list 30 that includes both the tracking areas.

Figure 10:
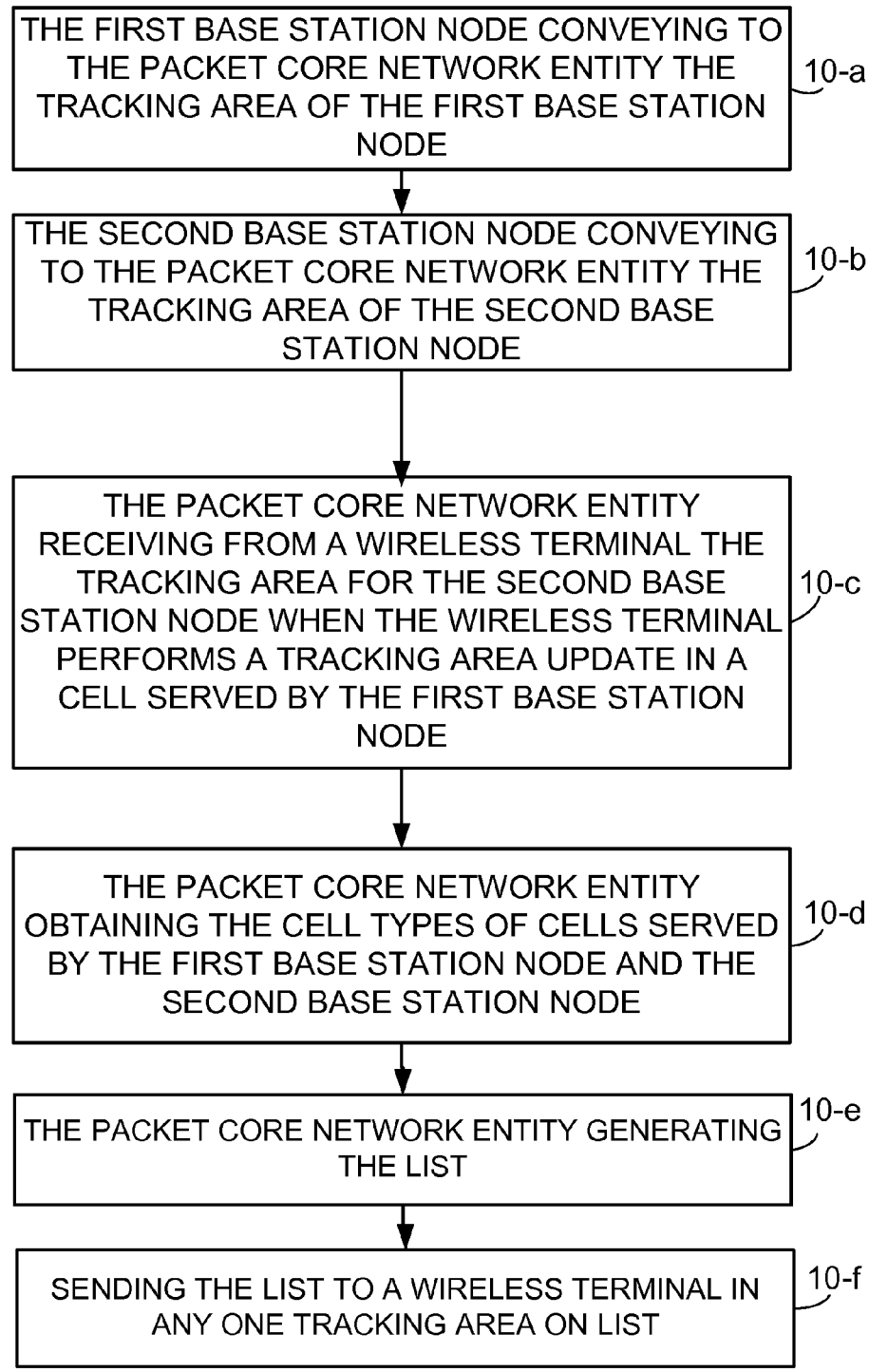
FIG. 10 is a flowcharting showing basic example, representative acts or steps comprising a list generation mode based on tracking area update (TAU) according to an example embodiment and mode.

FIG. 10 shows example, representative acts or steps comprising the list generation mode based on tracking area update (TAU). In FIG. 10 the terminology "first base station node" and "second base station node" is utilized. Whether the macro base station node or the low power base station node qualifies for either the first base station node or the second base station node depends on which of two particular scenarios is of interest. In an update in low power base station node scenario, the first base station node is the low power base station node and the second base station node is the macro base station node. Conversely, in an update in macro base station node scenario, the first base station node is the macro base station node and the second base station node is the low power mode. Preferably but not exclusively the list generation mode based on tracking area update (TAU) is typically performed in a scenario in which a macro base station node such as macro base station node 28M is the first base station node, and a low power base station node is the second base station node. The acts of FIG. 10, e.g., acts 10-*a* through 10-*d*, happen to illustrate the update in low power base station node scenario, so that the first base station node is the low power base station node and the second base station node is the macro base station node. It should be understood, however, that similar acts of FIG. 10 also apply to the update in macro base station node scenario.

The list generation mode based on tracking area update (TAU) is particularly useful in situations such as that shown in FIG. 5B, e.g., when the low power base station node and the macro base station node do not have overlapping coverage, so that there may be a "hole" or area of no coverage between the low power base station node and the macro base station node.

Act 10-a comprises the first base station node conveying to packet core network entity 22 the tracking area of the first base station node. Act 10-b comprises the second base station node conveying to packet core network entity 22 the tracking area of the second base station node. Act 10-c comprises the packet core network entity receiving from a wireless terminal the tracking area for the second base station node when the wireless terminal performs a tracking area update in a cell served by the first base station node. Act 10-d comprises the packet core network entity 22 obtaining the cell type of the cell serving the first base station node and the cell type of the cell serving the second base station node.

Act 10-e comprises the packet core network entity 22 generating the list 30. In generating list 30 the packet core network entity 22 uses the tracking area of the first base station node, the cell type of the cell served by the first base station node, the tracking area of the second base station node, and the cell type of the cell served by the second base station node. In particular, in an example implementation the packet core network entity 22 generates the list to include the tracking area of the first base station node and the tracking area of the second base station node if the cell types of the cell served by the first base station node and the cell type of the cell served by the second base station node are different. Thus, in an example embodiment, the list generator of packet core network entity 22 include on the list 30 both the tracking area of the first base station node and the tracking area of the second base station node when the packet core network entity receives the tracking area of the second base station node as a last visited tracking area upon the wireless terminal performing a tracking area update in a cell served by the first base station node, and when the list generator knows that at least one of the tracking area of the first base station node and the tracking area of the second base station node is associated with a low power node.

In act 10-c the packet core network entity receiving from the wireless terminal the tracking area for the second base station node when the wireless terminal performs a tracking area update in a cell served by the first base station node. Specifically, the packet core network entity 22 may receive the tracking area for the second base station node as a last visited tracking area when the wireless terminal performs the tracking area update. As indicated above, this last visited tracking area is the tracking area of a cell in which the wireless terminal resided before the wireless terminal performed its most recent tracking area update (TAU), and along with the tracking area of the cell in which the wireless terminal now resides is reported as part of tracking area update (and included in a S1AP INITIAL UE MESSAGE between the base station and the packet core network entity as explained previously). In an example embodiment act 10-e thus comprises the packet core network entity 22 generating the list 30 to include both the last visited tracking area and the new tracking area if at least one of the last visited tracking area and the new tracking area are associated with a low power node. The method of FIG. 10 may include a further act wherein the packet core network entity uses the last visited tracking area so that the packet core network entity can delete an old context for the wireless terminal (in an old packet core network entity).

Act 10-f comprises the packet core network entity 22 sending the list 30 to a wireless terminal in any one tracking area on list 30 as if the tracking areas on the list. Sending the list 30 to a wireless terminal in a tracking area on the list enables the packet core network entity 20 to obtain tracking area update information from the wireless terminal when the wireless terminal enters a cell that belongs to a tracking area not included on the list. Moreover, as a result of having sent the list, the packet core network entity may interact with the wireless terminal as if the tracking areas on the list were consolidated, e.g., by considering the wireless terminal to be in any of the tracking areas on the list, as in the manner of previously described act 8-3 and act 9-d. Act 10-f may include the packet core network entity 22 providing or sending the list 30 to one or more wireless terminals in one or more cells whose tracking area(s) is/are included on the list 30.

As mentioned above, act 10-a comprises the first base station node conveying to packet core network entity 22 the tracking area of the first base station node. Similarly, act 10-b comprises the second base station node conveying to packet core network entity 22 the tracking area of the second base station node. In an example implementation, one or more of act 10-a and act 10-b may comprise the respective base station node also including the cell type of the cell served by the respective base station node as new information element(s) in a S1 SETUP REQUEST message or in a eNB CONFIGURATION UPDATE message. The tracking area of the cell served by the respective base station node may also be included as an information element in the S1 SETUP REQUEST message. In an example embodiment the type of cell information element may be identical to a "Cell Type" information element which is currently passed between radio nodes as described in 3GPP TS 36.413 and 3GPP TS 25.413, both of which are incorporated herein by reference in their entireties.

As also indicated above, act 10-d comprises the packet core network entity 22 obtaining the cell type of the cell served by the first base station node and the cell type of the cell served by the second base station node In an example implementation, the packet core network entity obtains the cell type of the cell served by either or both of the first base station node and the second base station node based on a preconfigured relation of cell type and other information. To this end and in this example implementation packet core network entity 22 uses its cell type discriminator 46 in the manner previously described to obtain the cell type of the cell served by the either or both of the first base station node and the second base station node, using a known parameter for the cell served by the second base station (e.g., tracking area, Physical Cell Identity (PCI), E-UTRAN Cell Global Identity (E-CGI), etc., or a range of values associated with one or more such parameters) to index or retrieve an appropriate corresponding cell type value from a table or data base, e.g., in the manner shown in FIG. 6B. For example, there could be a partitioning of tracking areas in a network, so that (for example) low power nodes use a certain range and macro nodes use another range. This information is known to the packet core network entity 22, e.g., configured or stored in packet core network entity 22 or made available to the packet core network entity 22 (e.g., via network communications), so that packet core network entity 22 uses the information to construct the list 30. In some example embodiments an operation and maintenance (O&M) unit or node may configure or otherwise provide the packet core network entity 22 with the relation of tracking area values to another parameter so that packet core network entity 22 can generate the list 30.

If the information described above for determining cell type based on preconfiguration needs to be configured in MMEs (e.g., in a table or data base form), such preconfiguration information may be supplied to packet core network entity 22 through various ways. In some implementations the base station nodes may provide the information for the packet core network entity 22 to build such preconfiguration relations. In some implementations the preconfiguration information may be acquired elsewhere using various operation and management tools.

Figure 11:
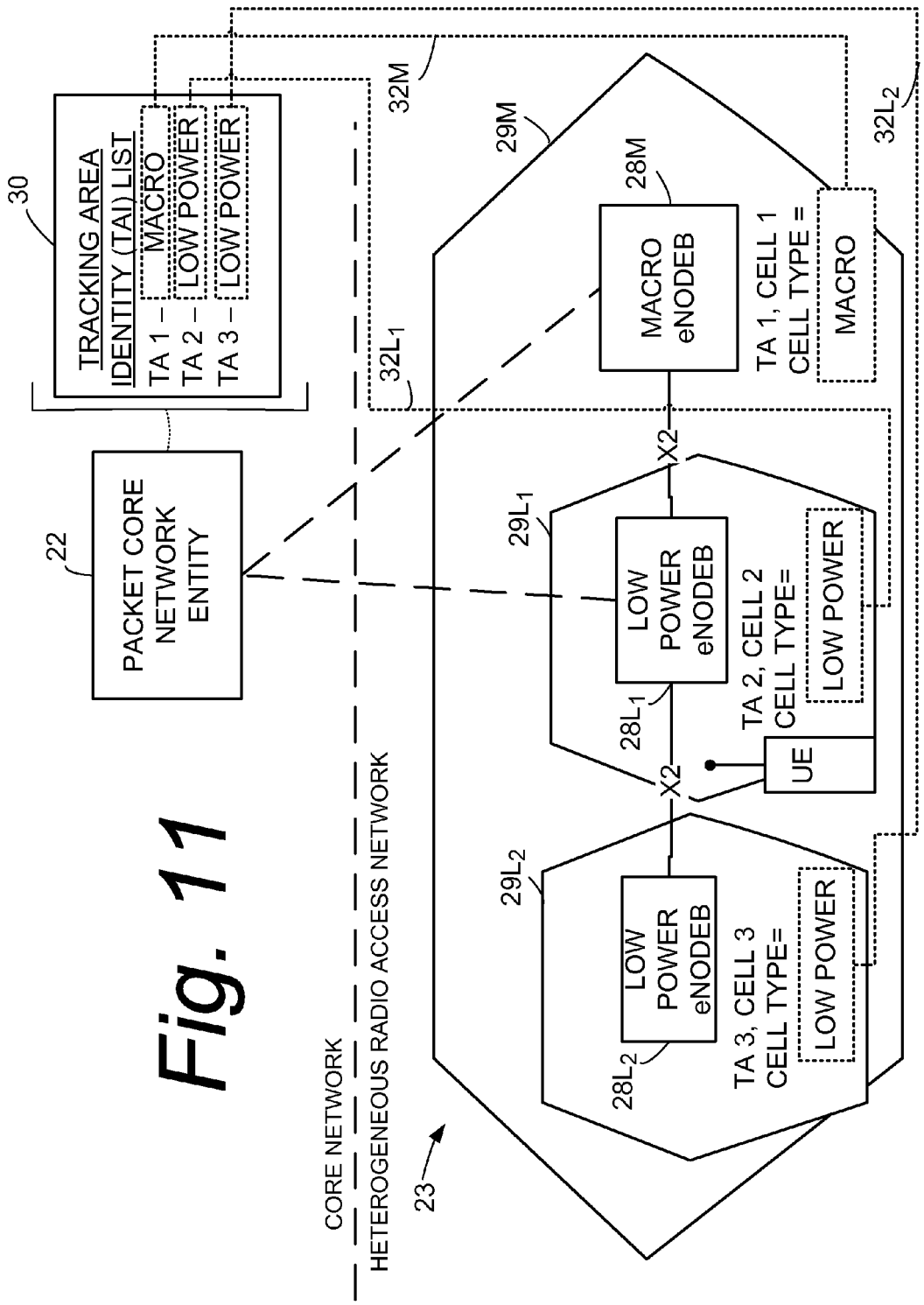
FIG. 11 is a diagrammatic view of portions of a communications network showing, e.g., a packet core network entity and portions of a heterogeneous radio access network according to an example embodiment and further illustrating a scenario giving rise to a list of tracking area including tracking areas for plural low power cells.

It should be understood that in any of the embodiments and modes described herein that the heterogeneous radio access network may further comprise more than one low power base station node. For example, in some example embodiments and modes the heterogeneous radio access network 23 may comprise a third base station node, e.g., a third base station node which is also a low power base station node. For example, FIG. 11 shows two low power base station nodes, e.g., low power base station node $28L_1$ and low power base station node $28L_2$, serving respective low power cells $29L_1$ and $29L_2$ and having respective tracking area identities TA=2 and TA=3. In the situation of FIG. 11 the packet core network entity 22 generates list 30 so as to include the tracking areas of all of macro cell 29M, low power cell $29L_1$, and low power cell $29L_2$. In other words, in embodiments comprising three or more base station nodes, the method further comprises the packet core network entity obtaining information a tracking area and a cell type for the third base station node, and the packet core network entity generating the list of tracking areas to further include the tracking area for the third base station node.

The embodiments comprising three or more base station nodes encompass several scenarios, of which the following are merely examples. In one example scenario, the second base station node and the third base station node are both neighbors to the first base station node. In another example scenario, e.g., the scenario illustrated in FIG. 11, the second base station node and the third base station node are both within coverage of the first base station node. In yet another example scenario the second base station node and the third base station node share a same tracking area identity.

In another of its aspects the technology disclosed herein concerns a method of operating a packet core network entity such as packet core network entity 22. Example representative, non-limiting acts of operating a packet core network entity according to an example embodiment and mode are essentially those illustrated in FIG. 8, and are understood from the preceding discussion of network structure and the operation of the network in generating the list 30. For example, the acts of FIG. 8 may be performed by packet core network entity 22. In addition, the acts of FIG. 8A may also be performed by packet core network entity 22. Moreover, as understood from the foregoing method of operating the network, the method of operating the packet core network entity 22 can include both the list generation mode based on neighbor node-reporting and the list generation mode based on tracking area update (TAU).

Figure 12:
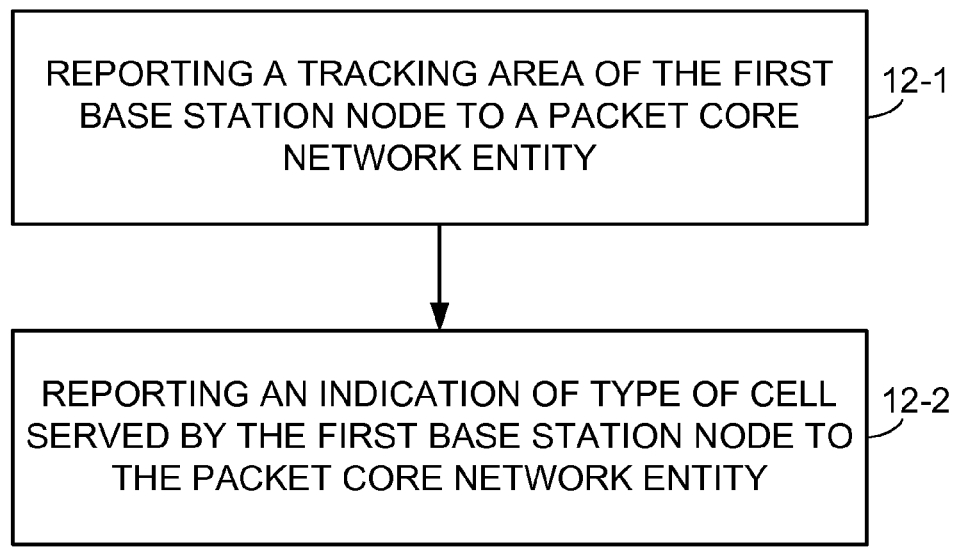
FIG. 12 is a flowcharting showing basic, representative acts or steps comprising a method of operating a base station node according to an example embodiment and mode.

In another of its aspects the technology disclosed herein concerns a method of operating a base station node of a heterogeneous radio access network. Example representative, non-limiting basic acts of operating a base station node according to an example embodiment and mode are essentially those illustrated in FIG. 12, and are also understood from the preceding discussion of network structure and the operation of the network in generating the list 30. In FIG. 12 the terminology "first base station node" and "second base station node" is again utilized. Whether the macro base station node or the low power base station node qualifies for either the first base station node or the second base station node depends on which of two particular scenarios is of interest. For example, in a macro reporting scenario the macro base station node is the first base station node and the low power base station node is the second base station node. Conversely, in a low power reporting scenario the low power base station node is the first base station node and the macro base station node is the second base station node.

Act 12-1 comprises the base station node (e.g., the first base station node) reporting a tracking area of the first base station node to a packet core network entity (e.g., packet core network entity 22). Act 12-2 comprises the first base station node reporting an indication of type of cell served by the first base station node to the packet core network entity 22. The indication of cell type indicates whether the cell served by the first base station node is a macro cell or a low power cell.

Figure 12A:
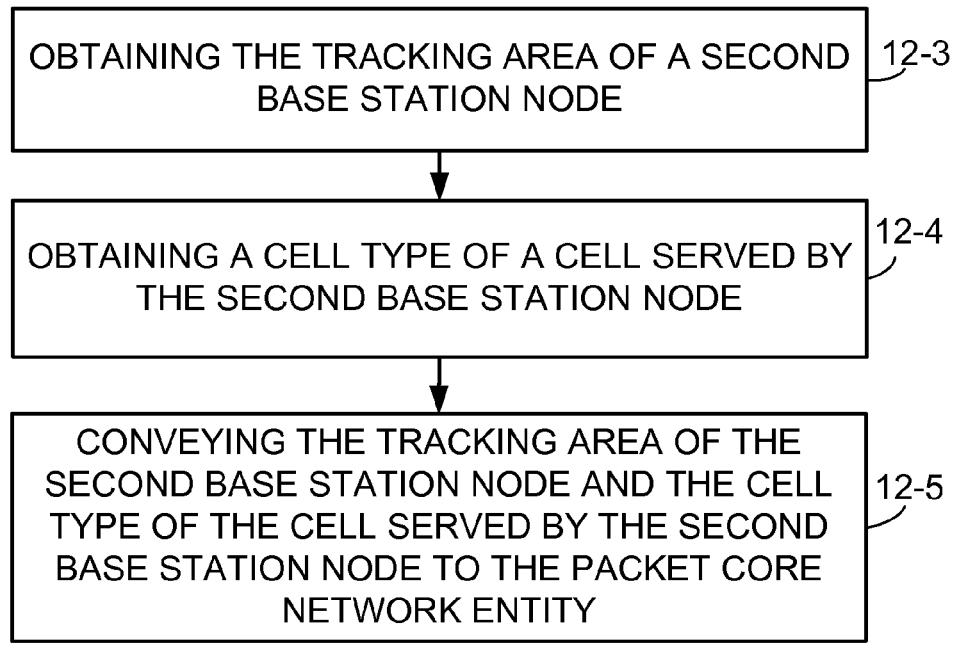
FIG. 12A is a flowcharting showing basic, representative further acts or steps comprising a method of operating a base station node according to another example embodiment and mode.

FIG. 12A illustrates yet further acts or steps that can be performed by a base station in an example embodiment and mode of operating a base station node. Act 12-3 comprises the first base station node obtaining the tracking area of a second base station node. Act 12-4 comprises the first base station node obtaining a cell type of a cell served by the second base station node. Act 12-5 comprises the first base station node conveying the tracking area of the second base station node and the cell type of the cell served by the second base station node to the packet core network entity 22. These further acts are also understood from the preceding discussion of the overall method of operating the communications network.

In an example implementation, the method of operating the base station further comprises the base station node using the already-described existing automatic neighbor relation function (ANR) to obtain from a wireless terminal the tracking area of the second base station node (e.g., as part of act 12-3).

In an example implementation, the method of operating the base station further comprises (e.g., as part of act 12-5) the base station node including the tracking area of the second base station node and the cell type of the cell served by the second base station node as new information element(s) in a ENB CONFIGURATION UPDATE message.

In an example implementation, the method of operating the base station further comprises the base station node obtaining the cell type of the cell served by the second base station node based on a preconfigured relation of cell type and other information (e.g., as part of act 12-4). The base station node may use its cell type discriminator 56 in a manner previously described to obtain or determine the cell type of the second base station node. As already mentioned, in various example implementations such other information may comprise at least one parameter such as tracking area, Physical Cell Identity (PCI), and E-UTRAN Cell Global Identity (E-CGI), or a range of values associated with one or more such parameter(s).

Figure 6C:
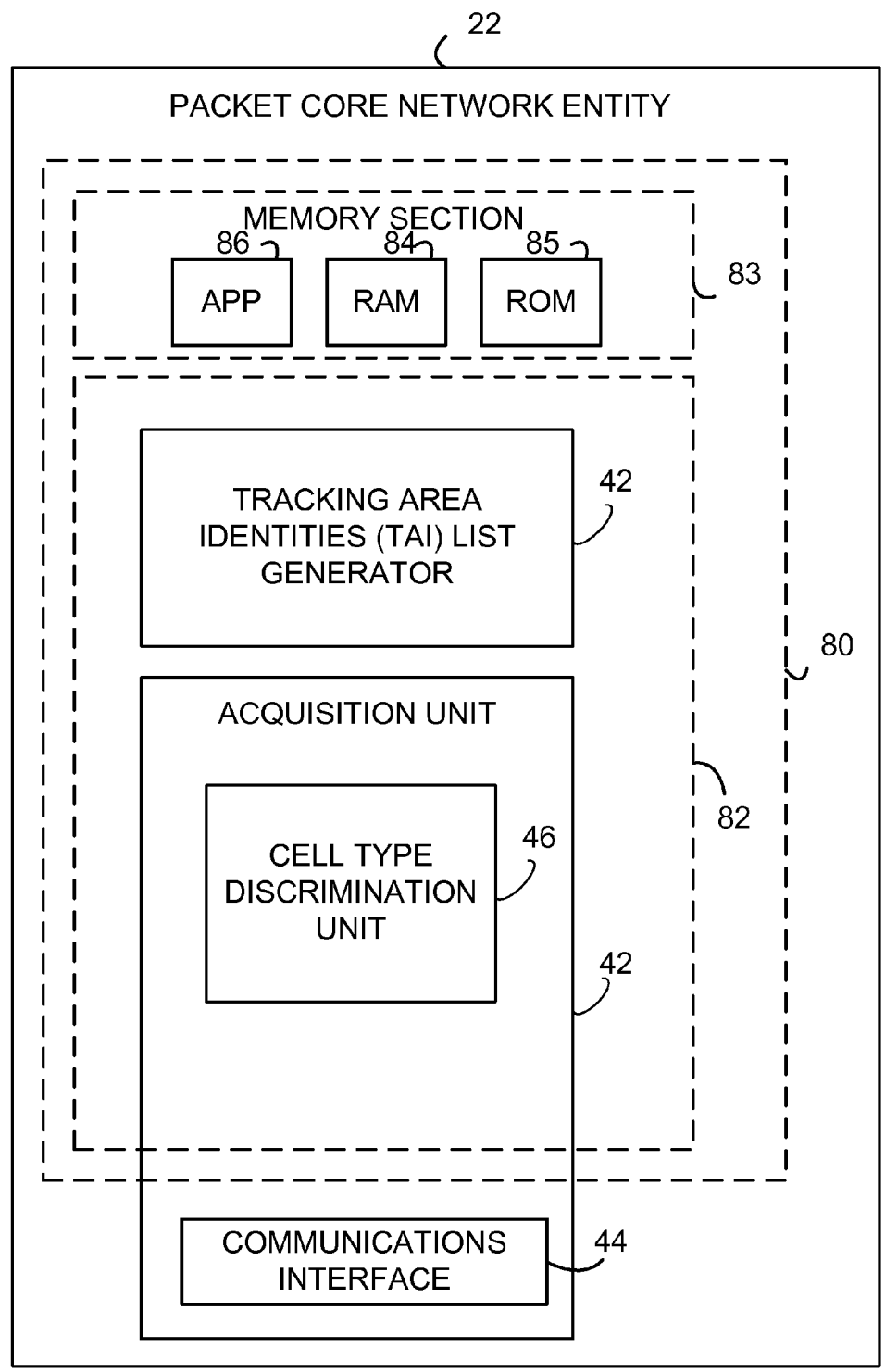

In example embodiments, functionalities of the packet core network entity 22 and a base station node 28 (whether a macro base station node 28M or a low power base station node 28L) may be realized using electronic circuitry. For example, FIG. 6C shows an embodiment of packet core network entity 22 wherein list generator 42 and at least portions of acquisition unit 40 (such as cell type discriminator 46 in the embodiments which include a cell type discriminator 46) are realized by electronic circuitry and particularly by platform 80, the platform 80 being framed by broken lines in FIG. 6C. The terminology "platform" is a way of describing how the functional units of the packet core network entity can be implemented or realized by machine including electronic circuitry. One example platform 80 is a computer implementation wherein one or more of the framed elements including the list generator list 42 and/or cell type discriminator 46 are realized by one or more processors 82 which execute coded instructions and which use non-transitory signals in order to perform the various acts described herein. In such a computer implementation the packet core network entity can comprise, in addition to a processor(s), memory section 83 (which in turn can comprise random access memory 84; read only memory 85; application memory 86 (which stores, e.g., coded instructions which can be executed by the processor to perform acts described herein); and any other memory such as cache memory, for example.

Typically the platform 80 of the packet core network entity also comprises other input/output units or functionalities, not illustrated in FIG. 6C, such as a keypad; an audio input device (e.g. microphone); a visual input device (e.g., camera); a visual output device; and an audio output device (e.g., speaker). Other types of input/output devices can also be connected to or comprise the packet core network entity.

In the example of FIG. 6C the platform 80 has been illustrated as computer-implemented or computer-based platforms. Another example platform suitable for the packet core network entity in particular is that of a hardware circuit, e.g., an application specific integrated circuit (ASIC) wherein circuit elements are structured and operated to perform the various acts described herein.

Figure 7C:
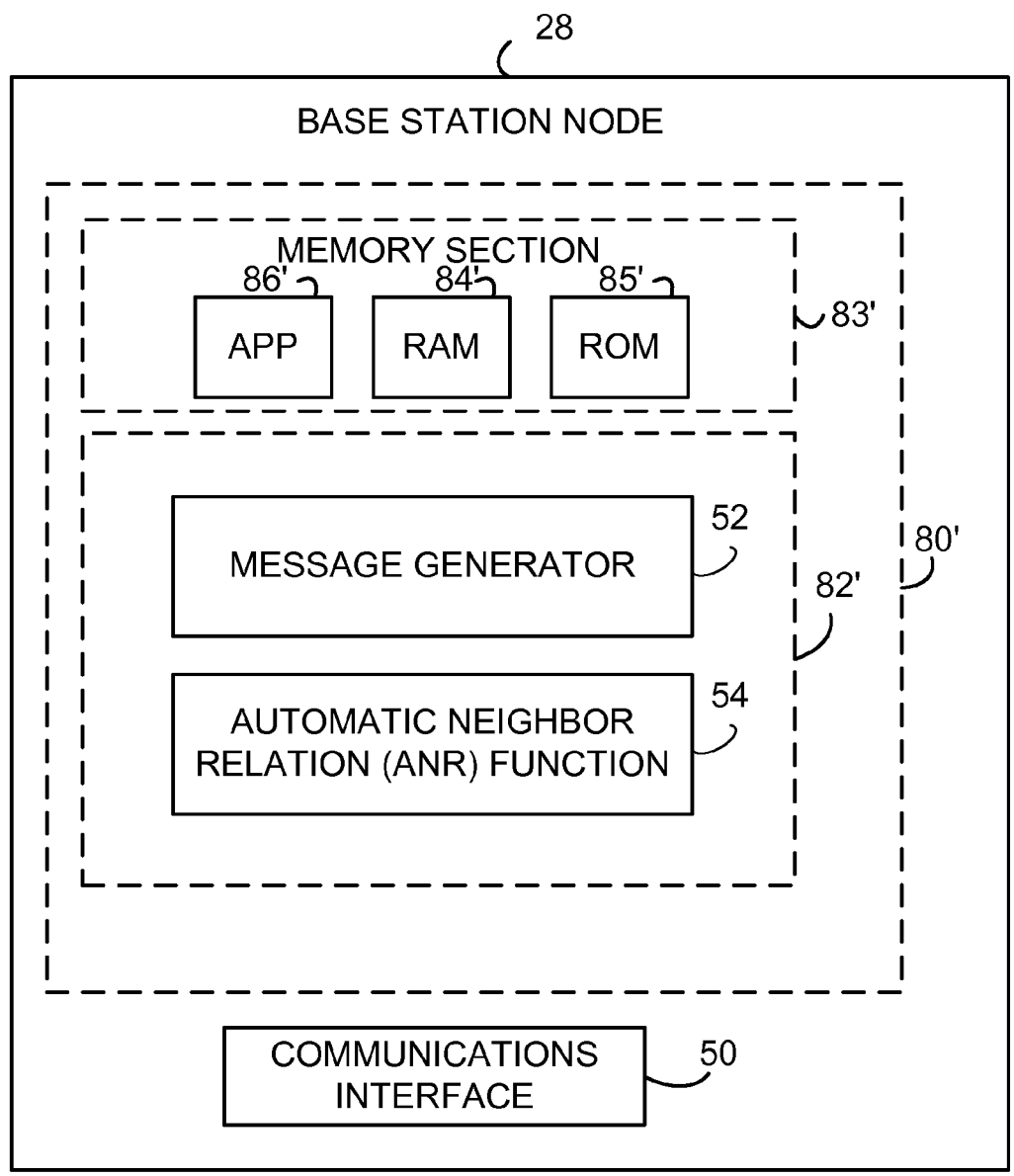

As another example, FIG. 7C shows an embodiment of base station node 28 wherein report generator 52 and automatic neighbor relation (ANR) function 54 (and even cell type discriminator 56) are realized by electronic circuitry and particularly by platform 80', the platform 80' being framed by broken lines in FIG. 7C. In similar manner with FIG. 6C, the platform 80' comprises of more processors 82' and memory section 83' (which in turn can comprise random access memory 84'; read only memory 85'; application memory 86' and any other memory such as cache memory, for example). Typically the platform 80' of the base station node 28 also comprises other input/output units or functionalities such as those mentioned in conjunction with the packet core network entity of FIG. 6C, and can alternatively be realized by electronic circuitry such as an ASIC.

As used herein, a "wireless terminal" can be a mobile station or user equipment unit (UE) such as a mobile telephone ("cellular" telephone) or a laptop with wireless capability (e.g., mobile termination), and thus can be, for example, a portable, pocket, hand-held, computer-included, or car-mounted mobile devices which communicates voice and/or data via a radio access network. Moreover, a wireless terminal can be a fixed terminal which communicates voice and/or data via a radio access network.

The technology disclosed herein has primarily been exemplified in the context of E-UTRAN and an evolved Packet core (EPC), e.g., LTE/SAE. However, the technology disclosed herein is not limited to any particular network or technology/generation, since the person skilled in the art realize that the principles are applicable for other mobile systems as well, such as cdma2000, which currently also uses location area lists.

The technology disclosed herein has advantages over other techniques and alleged solutions. For example, the technology disclosed herein differs from the so called 'TAU ping-pong' solution. In the prior art 'TAU ping-pong' solution, an entity such as a mobility management entity (MME) may know, after a wireless terminal performs a tracking area update (TAU), of the 'Last visited registered TAI' (which is included in the Tracking Area Update Request message) and the tracking area of the current cell in which the wireless terminal resides after the tracking area update (TAU). But the mobility management entity (MME) does not know whether one of these cells is a low power cell, and therefore does not consciously build a list of tracking areas having cells of different cell levels. It may well be that both these tracking areas belong to different macro cells, which would create an undesirable large paging area. Even if it were possible for the mobility management entity (MME) to use algorithms or the like to reduce also such disadvantages, such algorithms would be complex and would have slow convergence after network changes.

The technology disclosed herein is also superior in many respects to a solution that involves the low power cells have the same tracking area as the surrounding macro cell. Such other solution could be achieved by, for example, different mechanisms when the low power cell is configured. However, other solution may be impractical in scenarios when an operator wishes to identify the area type (or base station type) used and provide or apply different services or restrictions. These type of functions are to a large extent based on tracking area. For example, one could envision differentiated charging based on tracking area, or that a user needs to subscribe to additional service to use resources in a certain tracking area. Another example could be that the selection of S-GW/PDN gateway is based on tracking area, e.g. users in a low power node could have other gateways to the Internet than users in the macro network.

ABBREVIATIONS

3GPP $3^{rd}$ Generation Partnership Project
APN Access Point Name
CN Core Network
eNodeB E-UTRAN NodeB
eNB E-UTRAN NodeB
EPC Evolved Packet Core
E-UTRAN Evolved UTRAN
FAP Femto Access Point
GUMMEI Globally Unique MME Identity
GUTI Globally Unique Temporary Identity
GW Gateway
HAP Home Access Point
HeNB Home eNB
HeNB GW Home eNB Gateway
ID Identity
IE Information Element
IP Internet Protocol
LTE Long Term Evolution
MCC Mobile Country Code
MME Mobility Management Entity
MMEC MME Code
MMEGI MME Group Identity
MNC Mobile Network Code
M-TMSI M-Temporary Mobile Subscriber Identity
NAS Non-Access Stratum
O&M Operation and Maintenance
PLMN Public Land Mobile Network
PLMN ID PLMN Identity
RAN Radio Access Network
RRC Radio Resource Control
Interface between eNB and CN.
S1AP S1 Application Protocol
S1-MME Control Plane of S1.
S-TMSI S-Temporary Mobile Subscriber Identity
TA Tracking Area
TAI Tracking Area Identity
TAU Tracking Area Update
UE User Equipment
UTRAN Universal Terrestrial Radio Access Network
X2 Interface between eNBs.

xDSL X Digital Subscriber Line (referring to the DSL family of technologies where "X" stands for any of the letters that can be placed before "DSL", e.g. A or V)

Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method of operating a packet core network entity characterized by:

obtaining information regarding plural base station nodes of a heterogeneous radio access network, the plural base station nodes comprising a first base station node and a second base station node, at least one of the first base station node and the second base station node being a macro base station node and another of the first base station node and the second base station node being a low power base station node, the obtained information comprising:

a tracking area for the first base station node;

an indication of cell type for a cell served by the first base station node;

a tracking area for the second base station node; and an indication of cell type for the cell served by the second base station node;

the packet core network entity receiving, from the first base station node:

(1) the tracking area for the first base station node and an indication of cell type for the cell served by the first base station node:

(2) the tracking area for the second base station node and an indication of cell type for a cell served by the second base station node in a eNB CONFIGURATION UPDATE message; and generating a list of tracking areas using the indication of cell type for the first base station node and the indication of cell type for the low power base station node, the list comprising the tracking area for the macro base station node and the tracking area for the low power base station node, the packet core network generating the list using the tracking area of the first base station node and the tracking area of the second base station node if the cell types of the cell served by the first base station node and the cell type of the cell served by the second base station node are different.

2. The method of claim 1, further comprising:

sending the list of tracking areas to a wireless terminal in one of the tracking areas; and, as a result of having sent the list to the wireless terminal, obtaining tracking area update information from the wireless terminal when the wireless terminal enters a cell that belongs to a tracking area not included on the list.

3. The method of claim 1, further comprising the packet core network entity:

sending the list of tracking areas to a wireless terminal in one of the tracking areas; and performing at least one of the following:

permitting a wireless terminal to refrain from performing a normal tracking area update so long as the wireless terminal camps on a cell belonging to a tracking area on the list; and paging a wireless terminal in all tracking areas included on the list.

4. The method of claim 1, wherein the first base station node is the macro base station node and the second base station node is the low power base station node.

5. The method of claim 1, wherein the first base station node is the low power base station node and the second base station node is the macro power base station node.

6. The method of claim 1, further comprising:

the packet core network entity receiving from a wireless terminal the tracking area for the second base station node when the wireless terminal performs a tracking area update in a cell served by the first base station node.

7. The method of claim 6, further comprising the packet core network entity obtaining the cell type of the cell(s) served by either or both the first base station node and the second base station node based on a preconfigured relation of cell type and other information, the other information comprising a parameter, the parameter being at least one of tracking area, Physical Cell Identity (PCI), E-UTRAN Cell Global Identity (E-CGI), and a range of values associated with one or more of the parameter(s).

8. The method of claim 6, further comprising:

the packet core network entity receiving from a wireless terminal the tracking area of the second base station node as a last visited tracking area when the wireless terminal performs a tracking area update in a new tracking area, the new tracking area being the tracking area of the first base station node; and generating the list to include both the last visited tracking area and the new tracking area if at least one of the last visited tracking area and the new tracking area are associated with a low power node.

9. A method of operating a communications network comprising a packet core network entity and a heterogeneous radio access network, the heterogeneous radio access network comprising plural base station nodes including a first base station node and a second base station node, at least one of the first base station node and the second base station node being a macro base station node and another of the first base station node and the second base station node being a low power base station node, the method comprising:

the packet core network entity obtaining information comprising:
  a tracking area for the first base station node;
  an indication of cell type for a cell served by the first base station node;
  a tracking area for the second base station node; and
  an indication of cell type for the cell served by the second base station node;
the packet core network entity generating a list of tracking area identities using the indication of cell type for the first base station node and the indication of cell type for the low power base station node, the list comprising the tracking area for the macro base station node and the tracking area for the low power base station node;
the method further comprising:
  (a) the first base station node obtaining the tracking area of the second base station node and the cell type of a cell served by the second base station node:
  (b) the first base station node conveying to the packet core network entity (1) the tracking area of the first base station node and the cell type of the cell served by the first base station node: and (2) the tracking area of the second base station node and the cell type of the cell served by the second base station node, the first base station node including the tracking area of the second base station node and the cell type of the cell served by the second base station node as new information element(s) in a ENB CONFIGURATION UPDATE message:
  (c) the packet core network entity generating the list using the tracking area of the first base station node and the tracking area of the second base station node if the cell types of the cell served by the first base station node and the cell type of the cell served by the second base station node are different.

10. The network of claim 9, further comprising the packet core network entity sending the list to a wireless terminal situated in either the tracking area of the first base station node or the tracking area of the second base station node.

11. The method of claim 10, further comprising:
  the wireless terminal thereafter using the list to determine when to perform a tracking area update;
  the wireless terminal performing the tracking area update when the wireless terminal enters a cell that belongs to a tracking area not included on the list.

12. The method of claim 9, further comprising for act (a) the first base station node determining the cell type of the cell served by the second base station node based on a preconfigured relation of cell type and other information, the other information comprising a parameter, the parameter being at least one of tracking area, Physical Cell Identity (PCI), E-UTRAN Cell Global Identity (E-CGI), and a range of values associated with one or more of the parameter(s).

13. The network of claim 9, further comprising the packet core network entity receiving from a wireless terminal the tracking area for the second base station node when the wireless terminal performs a tracking area update in a cell served by the first base station node.

14. The method of claim 13, further comprising the first base station node conveying to the packet core network entity the tracking area of the first base station node and the second base station node conveying to the packet core network entity the tracking area of the second base station node.

15. The method of claim 13, further comprising the packet core network entity obtaining the cell type of the cell(s) served by either or both the first base station node and the second base station node based on a preconfigured relation of cell type and other information, the other information comprising a parameter, the parameter being at least one of tracking area, Physical Cell Identity (PCI), E-UTRAN Cell Global Identity (E-CGI), and a range of values associated with one or more of the parameter(s).

16. The method of claim 13, further comprising:
  the packet core network entity receiving from a wireless terminal the tracking area of the second base station node as a last visited tracking area when the wireless terminal performs a tracking area update in a new tracking area, the new tracking area being the tracking area of the first base station node; and
  generating the list to include both the last visited tracking area and the new tracking area if at least one of the last visited tracking area and the new tracking area are associated with a low power node.

17. The method of claim 16, further comprising sending the list to a wireless terminal situated in either the last visited tracking area or the new tracking area.

18. The method of claim 9, wherein the heterogeneous radio access network further comprises a third base station node which is a low power base station node, and wherein the method further comprises:
  the packet core network entity obtaining information on a tracking area and a cell type for the third base station node;
  the packet core network entity generating the list of tracking area identities to further include the tracking area for the third base station node.

19. A method of operating a base station node of a heterogeneous radio access network, the heterogeneous radio access network comprising both a macro base station node and a low power base station node with the base station node being either the macro base station node or the low power base station node, the method comprising:
  the base station node reporting a tracking area of the base station node to a packet core network entity;
  the base station node obtaining the tracking area of a second base station node and a cell type of a cell served by the second base station node;
  the base station node reporting an indication of type of cell served by the base station node to the packet core network entity;
  the base station node conveying the tracking area of the second base station node and the cell type of the cell served by the second base station node to the packet core network entity in a eNB CONFIGURATION UPDATE message:
  wherein the indication of cell type indicates differentiates between the cell served by the base station node being a macro cell or a low power cell.

20. A packet core network entity comprising:
  an acquisition unit configured to obtain information regarding plural base station nodes of a heterogeneous radio access network, the plural base station nodes comprising a first base station node and a second base station node, at least one of the first base station node and the second base station node being a macro base station node and another of the first base station node and the second base station node being a low power base station node, the obtained information comprising
  a tracking area for the first base station node;
  an indication of cell type for a cell served by the first base station node;
  a tracking area for the second base station node; and an indication of cell type for the cell served by the second base station node, the tracking area of the second base station node and the cell type of the cell served by the second base station node being obtained as new information element(s) in a ENB CONFIGURATION UPDATE message;

a list generator configured to generate a list of tracking area identities using the indication of cell type for the first base station node and the indication of cell type for the low power base station node, the list comprising the tracking area for the first base station node and the tracking area for the second base station node, the list generator being further configured to generate the list using the tracking area of the first base station node and the tracking area of the second base station node if the cell types of the cell served by the first base station node and the cell type of the cell served by the second base station node are different.

21. The entity of claim 20, wherein the list generator is configured to include on the list both the tracking area of the first base station node and the tracking area of the second base station node when the packet core network entity receives the tracking area of the second base station node as a last visited tracking area when the wireless terminal performs a tracking area update in a cell served by the first base station node, and when the list generator knows that at least one of the tracking area of the first base station node and the tracking area of the second base station node is associated with a low power node.

22. A packet core network entity of claim 20, further comprising a cell type discriminator configured to determining the cell type of a cell served by the at least one of the plural base station node based on a preconfigured relation of cell type and a parameter.

23. A packet core network entity of claim 20, further comprising electronic circuitry configured to generate the list.

24. A base station node of a heterogeneous radio access network, the base station comprising:

an interface configured to communicate information to a packet core network entity;

a report generator configured to include, in a message sent to the packet core network entity, a cell type identifier, wherein the cell type identifier is for a cell served by another base station of the heterogeneous radio access network, and wherein the report generator is further configured to include in the message an indication of a tracking area of the cell served by the another base station node of the heterogeneous radio access network, and wherein the tracking area and the cell type of the cell served by the another base station node of the heterogeneous radio access network is included as a new information element(s) in a ENB CONFIGURATION UPDATE message.

25. The base station node of claim 24, wherein the report generator comprises electronic circuitry.

* * * * *

UNITED STATES PATENT AND TRADEMARK OFFICE
CERTIFICATE OF CORRECTION

PATENT NO. : 8,537,751 B2  
APPLICATION NO. : 13/019056  
DATED : September 17, 2013  
INVENTOR(S) : Nylander et al.

Page 1 of 2

It is certified that error appears in the above-identified patent and that said Letters Patent is hereby corrected as shown below:

On the Title Page

Item (56), under "OTHER PUBLICATIONS", in Column 2, Line 12, delete "Release 10)." and insert -- (Release 10). --, therefor.

In the Specification

In Column 2, Line 2, delete "(OFDM)" and insert -- (OFDMA) --, therefor.

In Column 4, Line 55, delete "node. and" and insert -- node, and --, therefor.

In Column 6, Line 4, delete "ENB" and insert -- eNB --, therefor.

In Column 9, Line 57, delete "ENB" and insert -- eNB --, therefor.

In Column 13, Line 46, delete "node 29L" and insert -- node 28L --, therefor.

In Column 16, Line 15, delete "(e.g.," and insert -- e.g., --, therefor.

In Column 18, Line 1, delete "entity 30" and insert -- entity 22 --, therefor.

In Column 22, Line 2, delete "entity 20" and insert -- entity 22 --, therefor.

In Column 24, Line 36, delete "ENB" and insert -- eNB --, therefor.

In Column 24, Lines 64-65, delete "list generator list 42" and insert -- list generator 42 --, therefor.

In Column 25, Line 3, delete "(which" and insert -- which --, therefor.

Signed and Sealed this  
Fifteenth Day of July, 2014

Michelle K. Lee  
*Deputy Director of the United States Patent and Trademark Office*

CERTIFICATE OF CORRECTION (continued)
U.S. Pat. No. 8,537,751 B2

In Column 26, Line 58, delete "Interface" and insert -- S1 Interface --, therefor.

In the Claims

In Column 27, Line 51, in Claim 1, delete "receiving,from" and insert -- receiving, from --, therefor.

In Column 27, Line 55, in Claim 1, delete "node:" and insert -- node; --, therefor.

In Column 29, Line 17, in Claim 9, delete "node:" and insert -- node; --, therefor.

In Column 29, Line 21, in Claim 9, delete "node:" and insert -- node; --, therefor.

In Column 29, Line 27, in Claim 9, delete "ENB" and insert -- eNB --, therefor.

In Column 29, Line 28, in Claim 9, delete "message:" and insert -- message; --, therefor.

In Column 30, Line 47, in Claim 19, delete "message:" and insert -- message; --, therefor.

In Column 30, Line 60, in Claim 20, delete "comprising" and insert -- comprising: --, therefor.

In Column 31, Line 2, in Claim 20, delete "ENB" and insert -- eNB --, therefor.

In Column 32, Line 22, in Claim 24, delete "ENB" and insert -- eNB --, therefor.